US008037246B2

(12) United States Patent
Igarashi et al.

(10) Patent No.: US 8,037,246 B2
(45) Date of Patent: Oct. 11, 2011

(54) STORAGE SYSTEM AND STORAGE MANAGEMENT SYSTEM

(75) Inventors: Yoshinori Igarashi, Odawara (JP); Shoji Sugino, Odawara (JP); Atsushi Tejima, Odawara (JP)

(73) Assignee: Hitachi, Ltd., Tokyo (JP)

( * ) Notice: Subject to any disclaimer, the term of this patent is extended or adjusted under 35 U.S.C. 154(b) by 131 days.

(21) Appl. No.: 12/149,295

(22) Filed: Apr. 30, 2008

(65) Prior Publication Data

US 2008/0215813 A1    Sep. 4, 2008

Related U.S. Application Data

(63) Continuation of application No. 11/070,207, filed on Mar. 3, 2005, now Pat. No. 7,380,094.

(30) Foreign Application Priority Data

Dec. 28, 2004  (JP) ................................. 2004-381194

(51) Int. Cl.
*G06F 12/06* (2006.01)
*G06F 12/14* (2006.01)
(52) U.S. Cl. ................. 711/114; 711/173; 711/E12.001
(58) Field of Classification Search .................. 711/114, 711/E12.001, 173
See application file for complete search history.

(56) References Cited

U.S. PATENT DOCUMENTS

| | | | |
|---|---|---|---|
| 5,142,663 A | 8/1992 | Janis et al. | |
| 6,148,414 A | 11/2000 | Brown et al. | |
| 6,538,669 B1* | 3/2003 | Lagueux et al. | 715/764 |
| 2001/0027501 A1 | 10/2001 | O'Hara et al. | |
| 2002/0107810 A1 | 8/2002 | Nishio et al. | |
| 2003/0065902 A1 | 4/2003 | Shiga et al. | |
| 2003/0084377 A1 | 5/2003 | Parks et al. | |
| 2003/0135782 A1 | 7/2003 | Matsunami et al. | |
| 2005/0131830 A1 | 6/2005 | Juarez et al. | |
| 2005/0144380 A1* | 6/2005 | Suzuki et al. | 711/113 |
| 2007/0162954 A1* | 7/2007 | Pela | 726/2 |

FOREIGN PATENT DOCUMENTS

| | | |
|---|---|---|
| EP | 1315074 A2 | 5/2003 |
| JP | 2002-259214 | 9/2002 |
| JP | 2003288239 | 10/2003 |
| JP | 2003330622 | 11/2003 |

* cited by examiner

*Primary Examiner* — Kenneth Lo
(74) *Attorney, Agent, or Firm* — Brundidge & Stanger, P.C.

(57) ABSTRACT

A storage system whereby all managers of the storage system can easily collect the history data of the manager of each partition. The storage system is designed such that the memory resources within the system are managed by a system manager while partitions of the memory resources are managed by partition managers assigned for every partition unit. The storage system is provided with management modules that change the configuration of the memory resources corresponding to the content set by the system manager or partition manager, a history data management module that creates history data correlating the identifier of the partition unit that has undergone modification of the configuration of the memory resources, the setting content, and the identification data of the manager, and a history data storage unit that stores the history data.

18 Claims, 22 Drawing Sheets

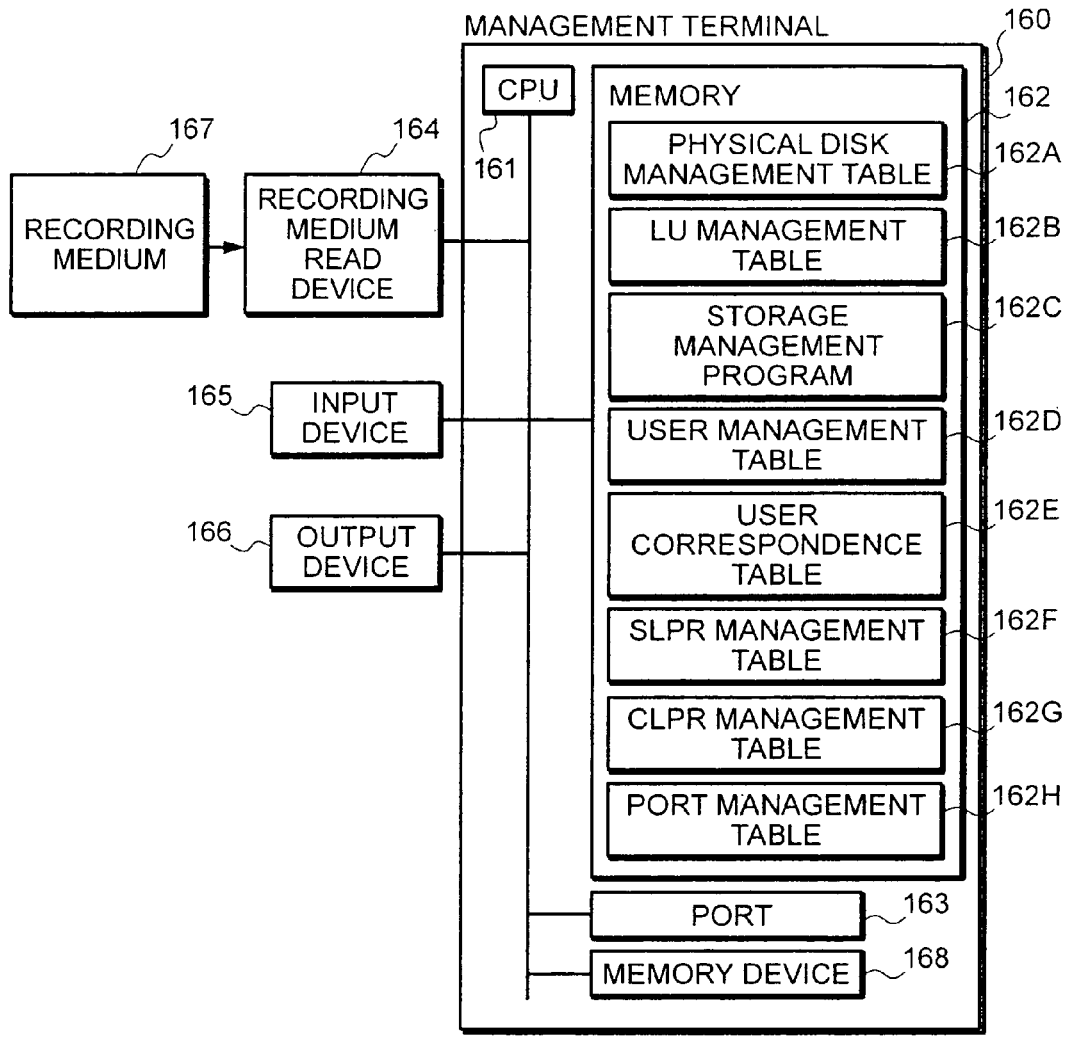

LU MANAGEMENT TABLE

| LU NO. | PHYSICAL DISK | VOLUME | RAID | ASSIGNED CLPR |
|---|---|---|---|---|
| #1 | #001,#002,#003,#004,#005 | 100GB | 5 | 0 |
| #2 | #001,#002,#003,#004,#005 | 300GB | 5 | 0 |
| #3 | #006,#007, | 200GB | 1 | 1 |
| ⋮ | ⋮ | ⋮ | ⋮ | ⋮ |

162B

CLPR MANAGEMENT TABLE — 162G

| IDENTIFIER | CACHE VOLUME | ECC GROUP | ASSIGNED SLPR IDENTIFIER |
|---|---|---|---|
| CLPR0 | 100GB | GRP0 | SLPR0 |
| CLPR1 | 100GB | GRP1 | SLPR1 |
| CLPR2 | 100GB | GRP2 | SLPR1 |
| CLPR3 | 100GB | GRP3 | SLPR2 |

| CONTROL REGION | DATA REGION |
|---|---|

CLPR0 CLPR1 CLPR2 CLPR3

| CLPR0 | CLPR1 | CLPR2 | CLPR3 |
|---|---|---|---|
| 182 | 2521 | 3204 | 1228 |
| 75 | 3624 | 1056 | 1824 |
| 39 | 251 | 5024 | 2005 |
| 1063 | 725 | 5025 | |
| 208 | | 207 | |

FIG.11

SLPR MANAGEMENT TABLE 162F

| IDENTIFIER | USABLE CU NO | USABLE SSID |
|---|---|---|
| SLPR0 | CU 0×01 | 4,5 |
| SLPR1 | CU 0×00 | 6,7 |
| SLPR2 | CU 0×02 | 8 |
| SLPR3 | CU 0×03<br>CU 0×04 | 9,10,11 |

FIG.12

PORT MANAGEMENT TABLE 162H

| PORT NO. | ASSIGNED SLPR IDENTIFIER |
|---|---|
| 0 | SLPR0 |
| 1 | SLPR1 |
| .... | |

FIG.13

USER MANAGEMENT TABLE 162D

| USER ID | USER NAME | PASSWORD | REMARKS |
|---|---|---|---|
| 000Z | root | XXX | STORAGE MANAGER |
| 123A | USER A | XXX | COMPANY A |
| 456B | USER B | XXX | COMPANY B |
| 789C | USER C | XXX | COMPANY C |
| ⋮ | ⋮ | ⋮ | ⋮ |

FIG.14

USER CORRESPONDENCE TABLE 162E

| USER NAME | SLPR |
|---|---|
| STORAGE MANAGER | ALL |
| USER A | SLPR0 |
| USER B | SLPR1 |
| USER C | SLPR2 |
| ⋮ | ⋮ |

FIG.16

USER DATA

| ID | USER NAME | SLPR NO. |
|---|---|---|
| 0000 | User-00 | 00 |
| 0001 | User-01 | 01 |

FIG.17

LOGIN DATA

| ID | LOGIN DATE | TIME | TIME ZONE | FUNCTION | IP ADDRESS | RESULTS |
|---|---|---|---|---|---|---|
| 0000 | 04/08/20 | 16:59:00:000 | GMT | Login | 126:255:255:0 | Normal |
| 0000 | 04/08/20 | 17:00:00:000 | GMT | Modify | 126:255:255:0 | Normal |
| 0001 | 04/08/20 | 17:11:00:000 | GMT | Login | 126:255:255:1 | Normal |
| 0001 | 04/08/20 | 17:12:00:000 | GMT | Modify | 126:255:255:1 | Error |
| 0000 | 04/08/20 | 17:20:00:000 | GMT | Logout | 126:255:255:0 | Normal |

FIG.18

SETTING DATA

| ID | MODIFICATION DATE | TIME | TIME ZONE | FUNCTION | OPERATION | RESULTS |
|---|---|---|---|---|---|---|
| 0000 | 04/08/20 | 17:02:00:000 | GMT | LUNM | Add LUN | Normal |
| 0000 | 04/08/20 | 17:05:00:000 | GMT | LUNM | Add LUN | Normal |
| 0000 | 04/08/20 | 17:10:00:000 | GMT | LUNM | Add LUN | Normal |
|  |  |  |  |  |  |  |

FIG.19

HISTORY DATA

| USER NAME | SLPR NO. | LOGIN DATE | TIME | TIME ZONE | FUNCTION | OPREATION (IP ADDRESS) | RESULTS |
|---|---|---|---|---|---|---|---|
| user-00 | 00 | 04/08/20 | 16:59:00:000 | GMT | Login | 126:255:255:0 | Normal |
| user-00 | 00 | 04/08/20 | 17:00:00:000 | GMT | Modify | 126:255:255:0 | Normal |
| user-00 | 00 | 04/08/20 | 17:02:00:000 | GMT | LUNM | Add LUN | Normal |
| user-00 | 00 | 04/08/20 | 17:05:00:000 | GMT | LUNM | Add LUN | Normal |
| user-00 | 00 | 04/08/20 | 17:10:00:000 | GMT | LUNM | Add LUN | Normal |
| user-01 | 01 | 04/08/20 | 17:11:00:000 | GMT | Login | 126:255:255:1 | Normal |
| user-01 | 01 | 04/08/20 | 17:12:00:000 | GMT | Modify | 126:255:255:1 | Error |
| user-01 | 00 | 04/08/20 | 17:20:00:000 | GMT | Logout | 126:255:255:0 | Normal |

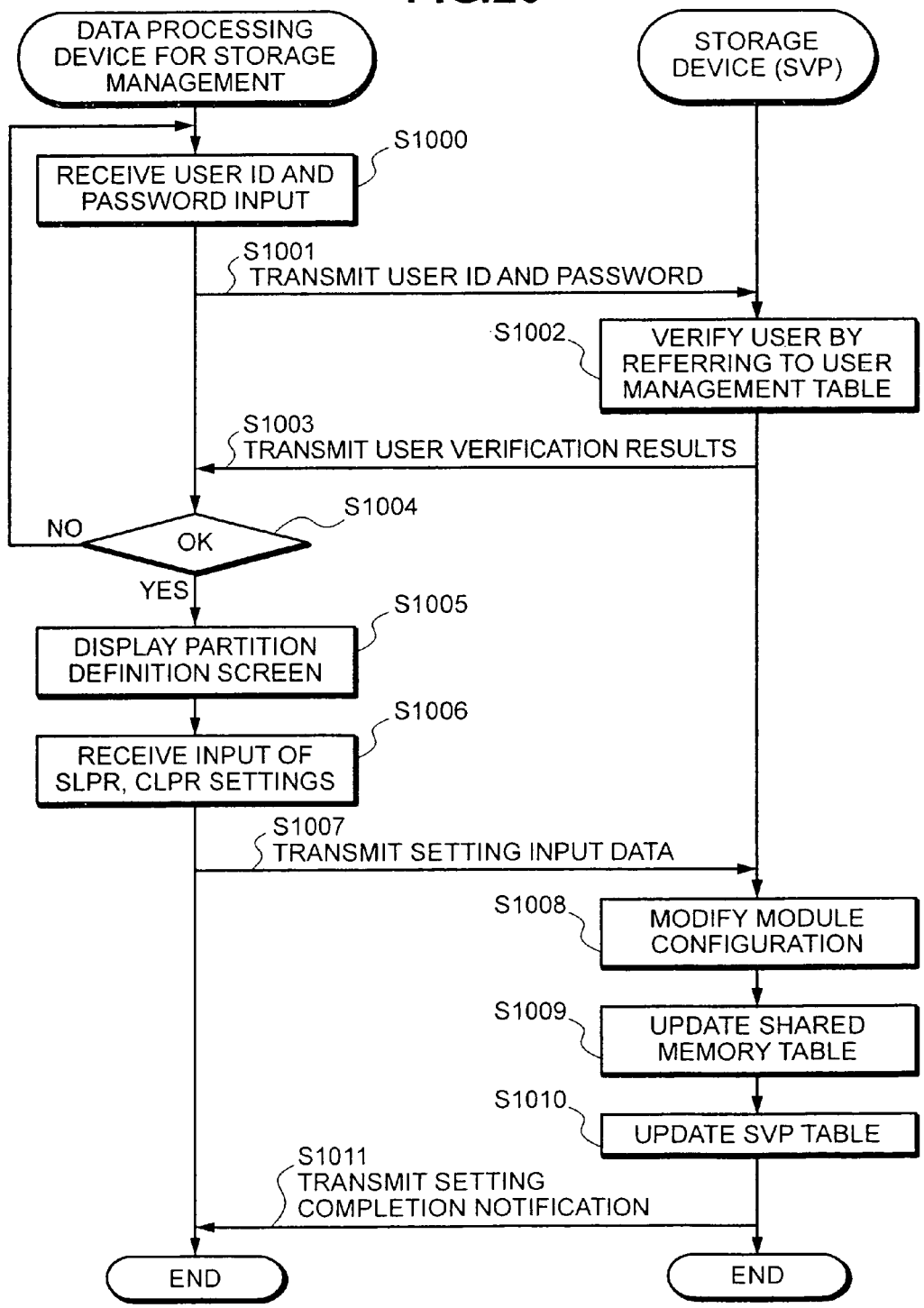

FIG.21

PARTITION DEFINITION SCREEN

| SLPR | CU | SSID |
|---|---|---|
| 0 | 01 | 4,5 |
| 1 | 00 | 6,7 |
| 2 | 02 | 8 |
| 3 | 03,04 | 9,10,11 |

| PORT | SLPR |
|---|---|
| 0 | 0 |
| 1 | 1 |
| 2 | 2 |
| 3 | 2 |

| LU | SLPR |
|---|---|
| 1 | 0 |
| 2 | 0 |
| 3 | 1 |

| CLPR | CACHE VOLUME | ECC GROUP | SLPR |
|---|---|---|---|
| 0 | 100GB | 0 | 0 |
| 1 | 100GB | 1 | 1 |
| 2 | 100GB | 2 | 1 |
| 3 | 100GB | 3 | 2 |

Cancel    OK

FIG. 25

| Type | Date | Time | User | SLPR | Function | Control |
|---|---|---|---|---|---|---|
| ⊗ Error | 10/25/2004 | 13:58:00 | USER01 | 01 | LUN Management | Add LUN |
| ⓘ Normal | 10/25/2004 | 13:57:20 | USER01 | 01 | LUN Management | Add LUN |
| ⓘ Normal | 10/25/2004 | 13:57:11 | USER01 | 01 | LUN Management | Add LUN |
| ⓘ Normal | 10/25/2004 | 13:56:11 | USER01 | 01 | LUN Management | Add LUN |
| ⓘ Normal | 10/25/2004 | 13:55:11 | USER01 | 01 | LUN Management | Add LUN |
| ⚠ Warning | 10/25/2004 | 13:53:11 | USER01 | 01 | LUN Management | Change Host Mode |
| ⓘ Normal | 10/25/2004 | 13:51:11 | USER01 | 01 | LUN Management | Add WWN |
| ⓘ Normal | 10/25/2004 | 13:50:50 | USER01 | 01 | LUN Management | Add WWN |
| ⓘ Normal | 10/25/2004 | 13:49:16 | USER01 | 01 | LUN Management | Add Host Group |
| ⓘ Normal | 10/25/2004 | 13:48:11 | USER01 | 01 | LUN Management | Add Host Group |
| ⓘ Normal | 10/25/2004 | 14:45:11 | USER01 | 01 | LUN Management | Add Host Group |
| ⓘ Normal | 10/24/2004 | 14:51:11 | SUN | 12 | Open Volume Management | Add Luse |
| ⓘ Normal | 10/24/2004 | 14:50:50 | SUN | 12 | Open Volume Management | Add Luse |
| ⓘ Normal | 10/24/2004 | 14:49:16 | SUN | 12 | Open Volume Management | Add Luse |
| ⓘ Normal | 10/24/2004 | 14:48:11 | SUN | 12 | Open Volume Management | CVS |
| ⓘ Normal | 10/24/2004 | 14:45:11 | SUN | 12 | Open Volume Management | CVS |

FIG. 26

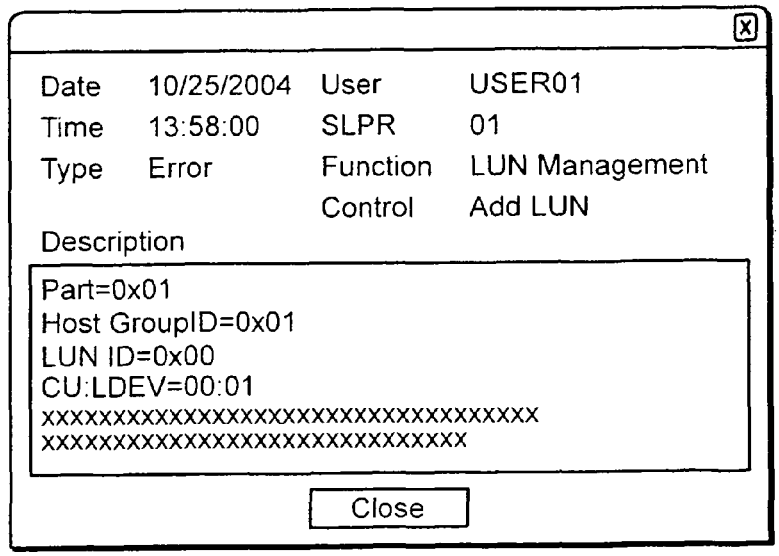

FIG.28

| Type | Date | Time | User | SLPR | Function | Control |
|---|---|---|---|---|---|---|
| ⊗ Error | 10/25/2004 | 13:58:00 | USER01 | 01 | LUN Management | Add LUN |
| ⓘ Normal | 10/25/2004 | 13:57:20 | USER01 | 01 | LUN Management | Add LUN |
| ⓘ Normal | 10/25/2004 | 13:57:11 | USER01 | 01 | LUN Management | Add LUN |
| ⓘ Normal | 10/25/2004 | 13:56:11 | USER01 | 01 | LUN Management | Add LUN |
| ⓘ Normal | 10/25/2004 | 13:55:11 | USER01 | 01 | LUN Management | Add LUN |
| ⚠ Warning | 10/25/2004 | 13:53:11 | USER01 | 01 | LUN Management | Change Host Mode |
| ⓘ Normal | 10/25/2004 | 13:51:11 | USER01 | 01 | LUN Management | Add WWN |
| ⓘ Normal | 10/25/2004 | 13:50:50 | USER01 | 01 | LUN Management | Add WWN |
| ⓘ Normal | 10/25/2004 | 13:49:16 | USER01 | 01 | LUN Management | Add Host Group |
| ⓘ Normal | 10/25/2004 | 13:48:11 | USER01 | 01 | LUN Management | Add Host Group |
| ⓘ Normal | 10/25/2004 | 14:45:11 | USER01 | 01 | LUN Management | Add Host Group |

FIG.29

LoginUserName-567890123456,xx,04/09/14,11:00:00:000,GMT,[Base],ChangeMode,Modify ↵
LoginUserName-567890123456,xx,04/09/14,11:00:00:000,GMT,[SI],paircreate,NormalEnd ↵
+CopyPace=Fast ↵
+{P-VOL(CU:LDEV),S-VOL(CU:LDEV),MU,Result}={00:00,01:00,0,NormalEnd},
{00:01,01:01,0,NormalEnd},{00:02,01:02,0,NormalEnd},{00:03,01:03,0,NormalEnd} ↵
+{00:04,01:04,0,NormalEnd},{00:05,01:05,0,NormalEnd},{00:06,01:06,0,NormalEnd},
{00:00,01:00,0,NormalEnd},{00:00,01:00,0,NormalEnd}, ↵
+{00:00,01:00,0,NormalEnd},{00:00,01:00,0,NormalEnd},{00:00,01:00,0,NormalEnd},
{00:00,01:00,0,NormalEnd},{00:00,01:00,0,NormalEnd} ↵
LoginUserName-567890123456,xx,04/09/14,11:00:00:000,GMT,[Base],ChangeMode,View ↵
↵
↵
↵

FIG.30

BASIC DATA FORMAT

| NO. | ITEM | CONTENT | LENGTH | REMARKS |
|---|---|---|---|---|
| 1 | USER NAME | LOGIN USER NAME | 26 | |
| 2 | SLPR# | 00-31 (DECIMAL, 2 DIGITS) | 2 | |
| 3 | DATE | YY/MM/DD | 6 | |
| 4 | TIME | HH:MM:SS:xxx | 12 | |
| 5 | Time ZONE | 3 CAPITAL LETTERS OF WESTERN ALPHABET (GMT, JST, ETC.) | 3 | |
| 6 | FUNCTION NAME | BASICALLY, THE PP NAME(CHANGES FOR EACH VENDOR). CASES WHEREIN THE PP CAN NOT BE SPECIFIED ARE AN EXCEPTION, AND THE NAME EXPRESSING THE FUNCTION IS STIPULATED | 10 | Login/logout, ETC.SHALL BE THE Base |
| 7 | OPERATION | NAME OF OPERATION | 20 | |
| 8 | PARAMETER | CONTENTS ARE FREE | 20 | |
| 9 | RESULT | RESULT OF OPERATION NORMAL END: Normal end ERROR END: Error PERTIAL END: Warning | 19 | |
| 10 | SEPARATION | EACH ELEMENT IS SEPARATED BY "," | 9 | |
| Total | | | 127 | |

FIG.31

OUTPUT RULES FOR DETAILED DATA

| NO. | ITEM | CONTENT | REMARKS |
|---|---|---|---|
| 1 | HEADER CHARACTERS | "+" ADDED TO HEADER OF DETAILED DATA | |
| 2 | NUMERIC CODE | DECIMAL: HEXADECIMAL: 0x ADDED, a-f IN LOWER CASE BINARY: B ADDED | |
| 3 | DIGIT MATCHING | 0 IS NOT SUPPRESSED IF 4 DIGIT DECIMAL, "0000" RATHER THAN "0" IS USED | |
| 4 | NUMERIC SUPPLEMENT AND ADDED DATA, ETC. | ENCLOSED BY () P-VOL (CU:LDEV) | |
| 5 | = | ITEM AND VALUE LINKED BY "=" Parameter=0 | |
| 6 | SEPARATION OF ELEMENTS | SEPARATED BY "," NO SPACE IS INSERTED AFTER "," PARAM0=0123, PARAM1=4567 | |
| 7 | SERIES OF MULTIPLE ELEMENTS OF THE SAME KIND | [,] CU:LDEV=[00:00,00:01,00:02] | |
| 8 | SERIES OF ELEMENTS OF DIFFERING KINDS | {,} CU:LDEV,Host={00:00, HOST-XX} | |
| 9 | SERIES OF MULTIPLE GROUP ELEMENTS OF THE SAME KIND | MyVOL, PairVOL[{00:00(P-VOL),00:01}, {00:02(S-VOL),3f:ff}] | |
| 10 | MF Vol | CU:LDEV=[00:00,00:01,00:02] | |
| 11 | OPEN LU | PORT-GID-LUN=[1A-00-000,1A-00-001] | |
| 12 | ALPHANUMERIC/ROWS | THERE SHALL BE 150YTE[sic] ALPHANUMERIC CHARACTERS PER ROW. IF EXCEEDING THIS, THE LINE WILL BE BROKEN. | |

STORAGE SYSTEM AND STORAGE MANAGEMENT SYSTEM

CROSS-REFERENCES TO RELATED APPLICATIONS

This is a continuation application to U.S. patent application Ser. No. 11/070,207, filed Mar. 3, 2005, now U.S. Pat. No. 7,380,094, to which application relates to and claims priority from Japanese Patent Application No. 2004-381194, filed on Dec. 28, 2004, the entire disclosure of which is incorporated herein by reference.

BACKGROUND OF THE INVENTION

1. Field of the Invention

The present invention relates to a storage system and a storage management method, and more particularly to a technology to improve a storage system in which memory resources are partitioned and managed.

2. Description of the Related Art

The need for uniform management of memory resources has become evident recently, and as can be seen in operations by storage service providers, operations are conducted wherein multiple clients share a storage system on one device. In this kind of operation, the various service managers (called "partition managers" hereinafter) independently manage resources assigned to various clients. The storage system itself has come to have a resource partition and management function in order to efficiently and safely conduct this kind of operation. Service provision systems for individual service functions provided from the storage service provider to the storage resource users, for example, have been proposed as storage management technology for storage systems having this kind of resource partition and management function wherein the storage system manages and controls the number of users that can be provided for and the total volume of storage resources, and adequate licensing can thereby be performed in relation to service functions that the storage service provider offers to the users (for example, Patent Literature 1: Japanese Unexamined Laid-Open Patent Application No. 2002-230189). Additionally, for example, control of access to memory devices has been proposed wherein the control system call access from the host system to the data memory device is controlled by pre-set access restrictions, and access by each user to permissible devices and for permissible actions can be controlled (for example, Patent Literature 2: Japanese Unexamined Laid-Open Patent Application No. 2002-259214).

SUMMARY OF THE INVENTION

However, in storage systems of the past, the system manager that managed the entire storage system (called the "system manager" hereinafter) could not comprehend when and what settings the various partition managers had set in relation to the configurational data, etc. of the storage system. This is because the operational logs of the partition mangers accumulated into the respective individual management modules, and the operational logs could not be retrieved from the various management modules except by a system developer. To safely and smoothly utilize the storage system, a system architecture is being sought that enables the system manager to comprehend at any time what settings the various partition mangers have set, and if erroneous operations have been conducted, and that enables detection of this prior to producing a system failure.

Thus, the present invention addresses the issues of providing a storage system and storage management method in which the system manager of the storage system can easily collect the history data of the various partition mangers.

[Means to Resolve the Issues]

To resolve the aforementioned issues, the storage system of the present invention is a storage system comprising a plurality of channel control units, a plurality of disk control units, shared memory, cache memory, a physical disk connected to the disk control units, and connecting parts that connect the plurality of channel control units, the plurality of disk control units, the shared memory, and the cache memory, and being designed such that the memory resources within the storage system is managed by a system manager, and partitions of the memory resources are managed by partition managers assigned for every partition unit, the storage system comprising: a management module that modifies the configuration of the memory resources in accordance with the setting contents set by the system manager or the partition managers; a history data management module that creates history data which correlates the identifier of the partition unit in which the configuration of the memory resources has been modified, the setting contents, and the identification data of the manager; and a history data storage unit that stores the history data.

The storage management method of the present invention is a storage management method wherein a system manager manages the memory resources within a storage system comprising multiple channel control units, multiple disk control units, shared memory, cache memory, a physical disk connected to the disk control units, and connecting parts that connect the multiple channel control units, the multiple disk control units, the shared memory, and the cache memory; and partition managers are assigned for every partition unit of the memory resource and the partition managers manage the partition units; [comprising the steps of:] modifying the configuration of the memory resource in accordance with the contents of the settings set by the system manager or the partition managers; creating history information which relates the identifier of the partition unit in which the configuration of memory resources has been modified, the setting contents, and the identification data of the manager; and providing all of the history data to the system manager, but, from among the history data, providing to the partition manager only the history data that that particular partition manager executed.

According to the present invention, the system manager can easily comprehend when and what settings the various partition managers have set in relation to the memory resources of the storage system.

BRIEF DESCRIPTION OF THE DRAWINGS

FIG. 2 is a system configuration diagram of the management terminal;

FIG. 3 is an explanatory diagram of the physical disk management table;

FIG. 10 is an explanatory diagram of control region and data region of the cache memory;

FIG. 11 is an explanatory diagram of the SLPR management table;

FIG. 12 is an explanatory diagram of the port management table;

FIG. 13 is an explanatory diagram of the user management table;

FIG. 14 is an explanatory diagram of the user correspondence table;

FIG. 16 is an explanatory diagram of the user data;

FIG. 17 is an explanatory diagram of the login data;

FIG. 18 is an explanatory diagram of the setting data;

FIG. 19 is an explanatory diagram of the setting data;

FIG. 20 is a flowchart in order for the system manager to modify the configuration of the memory resources;

FIG. 21 is an explanatory diagram of the partition definition screen;

FIG. 25 is an explanatory diagram of the history data screen;

FIG. 26 is an explanatory diagram of a detailed data screen of an error log;

FIG. 28 is an explanatory diagram of the log data screen;

FIG. 29 is log data in the CSV format;

FIG. 30 is the basic data format of the log data;

FIG. 31 is the detailed data format of the log data;

DESCRIPTION OF THE PREFERRED EMBODIMENTS

Embodiments of the present invention will be explained below by referring to the diagrams.

Figure 1:
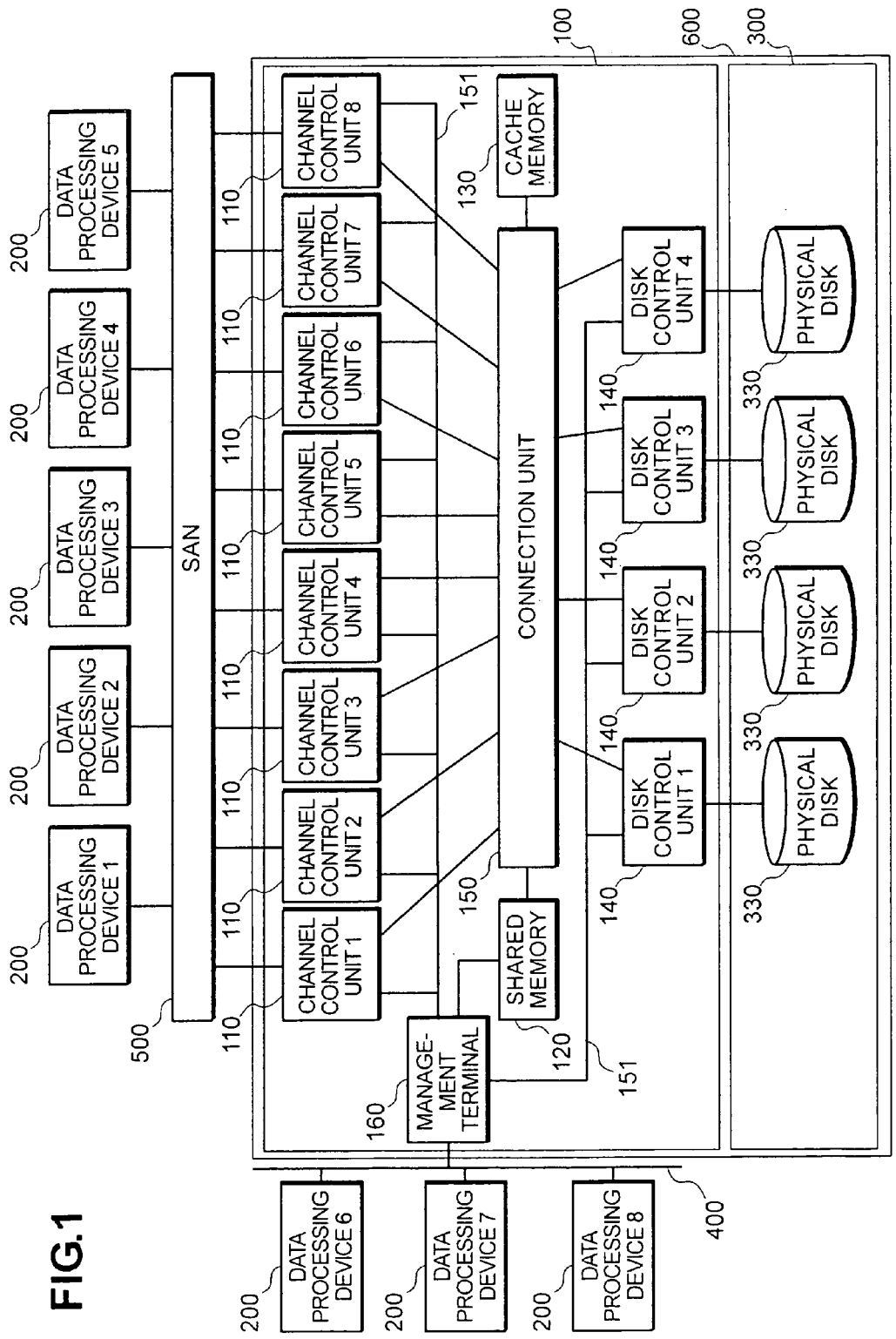
FIG. 1 is a system configuration diagram of the storage system 600 related to the present embodiment.

FIG. 1 indicates the overall system configuration of a storage system 600 in relation to an embodiment of the present invention. The storage system 600 is mainly configured by a storage control device 100, and a storage drive device 300. The storage control device 100, for example, controls the input/output of the storage drive device 300 by following the commands received from a data processing unit 200. For example, data input/output requests are received from data processing devices 1 through 5 (200), and data is read and written to a physical disk drive 330. In addition, the storage control device 100, for example, receives from data processing devices 6 through 8 various types of commands for managing the storage system 600, and conducts various types of processing such as setting and modifying configurational data of the storage system 600.

The data processing device 200 is a computer device comprising a CPU and memory, etc. The data processing devices 1 through 5 (200), for example, are higher order devices such as personal computers, workstations, or mainframe computers, and are used in automatic bank deposit and payment systems, and in airplane seat reservation systems, etc. Meanwhile, data processing devices 6 though 8 (200) are utilized as management computers for maintaining and managing the storage system 600.

Here, different users share the various data processing devices 200, and can make use of the system. For example, the system may be used by a user A sharing data processing devices 1, 2, and 6 (200), a user B sharing data processing devices 3, 4, 5, and 7 (200), and the system manager sharing a data processing device 8 (200). Here, users are, for example, businesses, departments within a business, or individuals, etc.

The data processing devices 1 through 5 (200) are connected to be able to communicate with the storage control device 100 through a SAN500. The SAN500 is a network that transfer data between the data processing devices 1 through 5 (200) in block units, which are management units of the data of the memory resources that the storage drive device 300 provides. The communications protocol that is executed between the data processing devices 1 though 5 (200) and the storage control device 100 through the SAN500 is, for example, a fiber channel protocol.

Additionally, the connection between the data processing devices 1 though 5 (200) and the storage control device 100 need not always be made through the SAN500, and for example, the connection may be made through a LAN (Local Area Network), or through a direct connection without a network. If connected through a LAN, for example, communications may be conducted following a TCP/IP (Transmission Control Protocol/Internet Protocol) protocol. If the data processing devices 1 through 5 (200) and the storage control device 100 are directly connected without mediation by a network, communications may be conducted following a communications protocol such as, for example, FICON (Fibre Connection) (registered brand name), ESCON (Enterprise System Connection) (registered brand name), ACONARC (Advanced Connection Architecture) (registered brand name), and FIBARC (Fibre Connection Architecture) (registered brand name).

Moreover, the data processing devices 6 through 8 (200) are connected to the storage control device 100 through a LAN 400. The LAN 400, for example, may be configured by the internet, or by a dedicated line. Communications between the data processing devices 6 through 8 (200) and the storage control device 100 conducted through the LAN 400 may be configured, for example, by following the TCP/IP protocol.

The storage drive device 300 comprises multiple physical disk drives 330. The physical disk drives 330 may be configured by a data recording medium such as a hard disk drive, or by multiple hard disk drives configured in a RAID (Redundant Arrays of Inexpensive Disks). (Multiple hard disk drives configured into one RAID may be called a "RAID group" or an "ECC group" hereinafter.) In addition, it is possible to set up a logical volume, which is a logical memory region (may also be called "LU" hereinafter), in a physical volume, which is a physical memory region provided by the physical disk drive 300 (A memory region for memorizing data, including physical volumes and logical volumes, may be called "memory volume 310" hereinafter.).

The storage control device 100 and the storage drive device 300 may be connected directly without mediation of a network, or may be connected through a network. Or, The storage drive device 300 may be configured as a single unit with the storage control device 100.

The storage control device 100 comprises a channel control unit 110, a shared memory 120, a cache memory 130, a disk control unit 140, a management terminal 160, and a connection unit 150.

The storage control device 100 communicates between the data processing devices 1 through 5 (200) based on the channel control units 1 through 8 (110) through the SAN500. The channel control unit 110 comprises a communications interface for communicating between data processing devices 200, and comprises functions that transfer data input/output commands between data processing devices 200. The various channel control units 110 together with the management terminal 160 are connected through an internal LAN 151. Micro-programs, etc. that the channel control units 110 execute can thereby be installed from the management terminal 160. The configuration of the channel control units 110 will be described in detail later.

The connection unit 150 is mutually connected with the channel control unit 110, the shared memory 120, the cache memory 130, the disk control unit 140, and the management terminal 160. The transfer of data and commands between the channel control unit 110, the shared memory 120, the cache memory 130, the disk control unit 140, and the management terminal 160 is conducted through the connection unit 150. The connection unit 150 is, for example, configured by a cross bar switch.

The shared memory 120 and the cache memory 130 are memory devices shared by the channel control unit 110 and the disk control unit 140 respectively. The shared memory 120 is mainly utilized for memorizing control data and commands, etc., and the cache memory 130 is mainly utilized for memorizing data.

For example, if the data input/output request that a given channel control unit 110 has received from a data processing device 200 is a write command, the channel control unit 110 in question writes the write command into the shared memory 120, and writes the write data received from the data processing device 200 into the cache memory 130. Meanwhile, the disk control unit 140 monitors the shared memory 120, and if the fact that a write command is written into the shared memory 120 is detected, [the disk control unit 140] follows the command in question, reads the write data from the cache memory 130, and writes the data onto the physical disk drive 300.

In addition, if the data input/output request that a given channel control unit 110 has received from a data processing device 200 is a read command, a search is conducted as to whether the targeted read data is present in the cache memory 130. Here, if the targeted read data is present in the cache memory 130, the channel control unit 110 reads that data from the cache memory 130, and transmits that data to the data processing device 200. Meanwhile, if the targeted read data is not present in the cache memory 130, the channel control unit 110 in question writes a read command into the shared memory 120. The disk control unit 140 normally monitors the shared memory 120, and if the fact that a read command is written into the shared memory 120 is detected, the disk control unit 140 reads the targeted read data from the storage drive device 300, writes the data to the cache memory 130, and writes this fact into the shared memory 120. Then, the channel control unit 110 detects that the targeted read data has been written into the cache memory 130, reads that data from the cache memory 130, and transmits the data to the data processing device 200.

In this way, data is transferred between the channel control units 110 and the disc control unit 140 through the cache memory 130. The channel control unit 110 and the disk control unit 140 write into the cache memory 130 the data to be read and written from among the data memorized on the physical disk drive 330.

Further, apart from a configuration in which the instruction to write and read data is executed indirectly from the channel control unit 110 to the disk control unit 140 mediated through the shared memory 120, for example, a configuration may be made in which the instruction to write and read data is executed directly from the channel control unit 110 to the disk control unit 140 without the mediation of the shared memory 120.

In addition, it is also possible to make a data input/output control unit by letting the channel control unit 110 have the function of the disk control unit 140.

The disk control unit 140 controls the storage drive device 300 by being connected communicably with a plurality of physical disk drives 330 that memorize data. For example, as described above, data is read and written to the physical disk drive 330 corresponding to the data input/output requests that the channel control unit 110 receives from the data processing device 200.

The various disk control units 140 together with the management terminal 160 are connected by the internal LAN 151, and can mutually communicate. Micro-programs, etc. that the disk control units 140 execute can thereby be installed from the management terminal 160. The configuration of the disk control units 140 will be described in detail later.

In the present embodiment, the shared memory 120 and the cache memory 130 have been described as being independently provided in relation to the channel control units 110 and the disk control units 140, but the present embodiment is not limited to this case, and the shared memory 120 or the cache memory 130 may be distributed to the channel control units 110 and disk control units 140 respectively. In this case, the connection units 150 mutually connect the channel control units 110 and disk control units 140 having the distributed shared memory 120 or cache memory 130.

In addition, at a minimum any of the channel control units 110, the disk control units 140, the connection units 150, the shared memory 120, and the cache memory 130 may be configured in a single unit.

The management terminal 160 are computers for maintaining and managing the storage system 600. By operating the management terminal 160, the operator can, for example, set the configuration of the physical disk drive 330 that is within the storage drive device 300, set the path that is the communications route between the data processing device 200 and the channel control unit 110, set the logical volume, and install micro-programs that are executed by the channel control unit 110 and the disk control unit 140. Here, the setting of the configuration of the physical disk drive 330 that is within the storage drive device 300 may be, for example, to expand or decrease the settings of the physical disk drive 330, or to modify the RAID configuration (modify from RAID1 to RAID5, etc.), etc. Further, from the management terminal 160 such operations may be conducted as confirming the operational status of the storage system 600, specifying a malfunctioning site, and installing an operating system that is executed by a channel control unit 110. An operator, etc. may execute these various types of settings and controls from a user interface comprising a management terminal 160, or from the user interface of the data processing devices 6 through 8 (200) displaying a Web page that is provided by a Web server operated by a management terminal 160. The operator, etc. may operate a management terminal 160 to set the target and contents to monitor for failures, and to set the failure notification address, etc.

The management terminal 160 may have the form of being built into the storage control device 100, or may have the form of being externally attached. Moreover, the management terminal 160 may be a computer that is dedicated to executing maintenance and management of the storage control device 100 and the storage drive device 300, or may be general purpose computer that has maintenance and management functions.

FIG. 2 indicates a system configuration of the management terminal 160. The management terminal 160 comprises a CPU 161, a memory 162, a port 163, a recording medium read device 164, an input device 165, an output device 166, and a memory device 168.

The CPU 161 conducts the overall control of the management terminal 160, and the maintenance and management functions of the storage system 600 can be offered by executing a storage management program 162C configured from code memorized in the memory 162 for executing various types of operations. In addition, for example, the CPU 161 can execute functions, etc. as the Web server described above by executing the storage management program 162C. Memorized in the memory 162 are a physical drive management table 162A, an LU management table 162B, a storage management program 162C, a user management table 162D, a user correspondence table 162E, an SLPR management table 162F, a CLPR management table 162G, and a port management table 162H.

FIG. 3 indicates the physical disk drive management table 162A. This table is a table for managing the physical disk drive 330 that the storage drive device 300 comprises. In the example indicated in this figure, of the numerous physical disk drives 330 that the storage drive device 300 comprises, disk numbers #001 through #006 have been set up. In addition, the capacities, RAID configurations, use status, and ECC group numbers have been set up in relation to the respective physical disk drives 330.

Figures 4, 5:
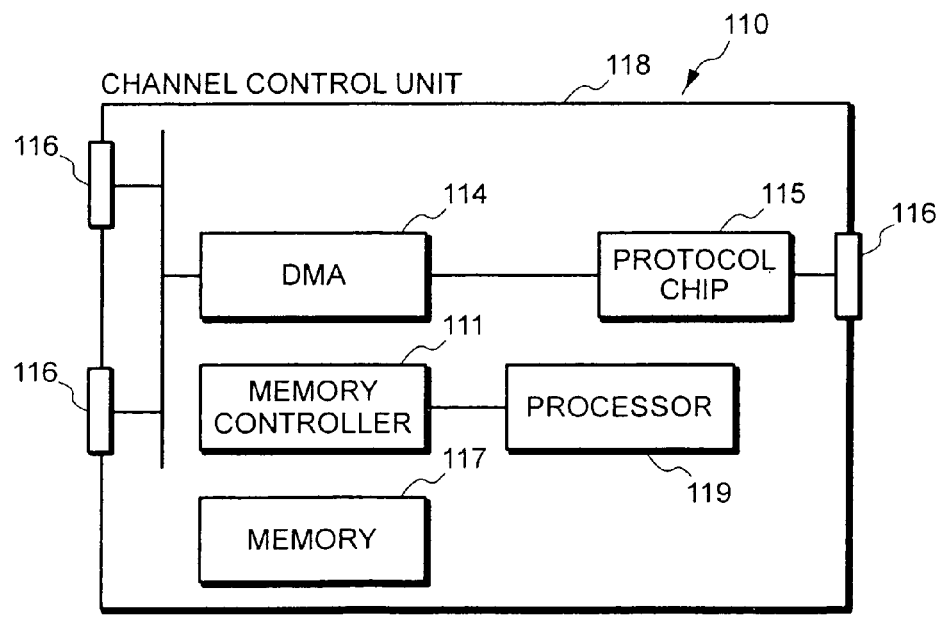
FIG. 4 is an explanatory diagram of the LU management table.
FIG. 5 is a system configuration diagram of the channel control unit.

FIG. 4 indicates the LU management table 162B. This table is a table for managing the logical volumes logically set up on the physical disk drive 330. In the example in this figure, of the numerous logical volumes set up on the storage drive device 300 above, LU numbers #1 through #3 have been set up. The physical disk drive numbers, capacities, RAID configurations, assigned CLPRs have been set up in relation to the respective logical volumes. CLPRs will be described later.

Figure 15:
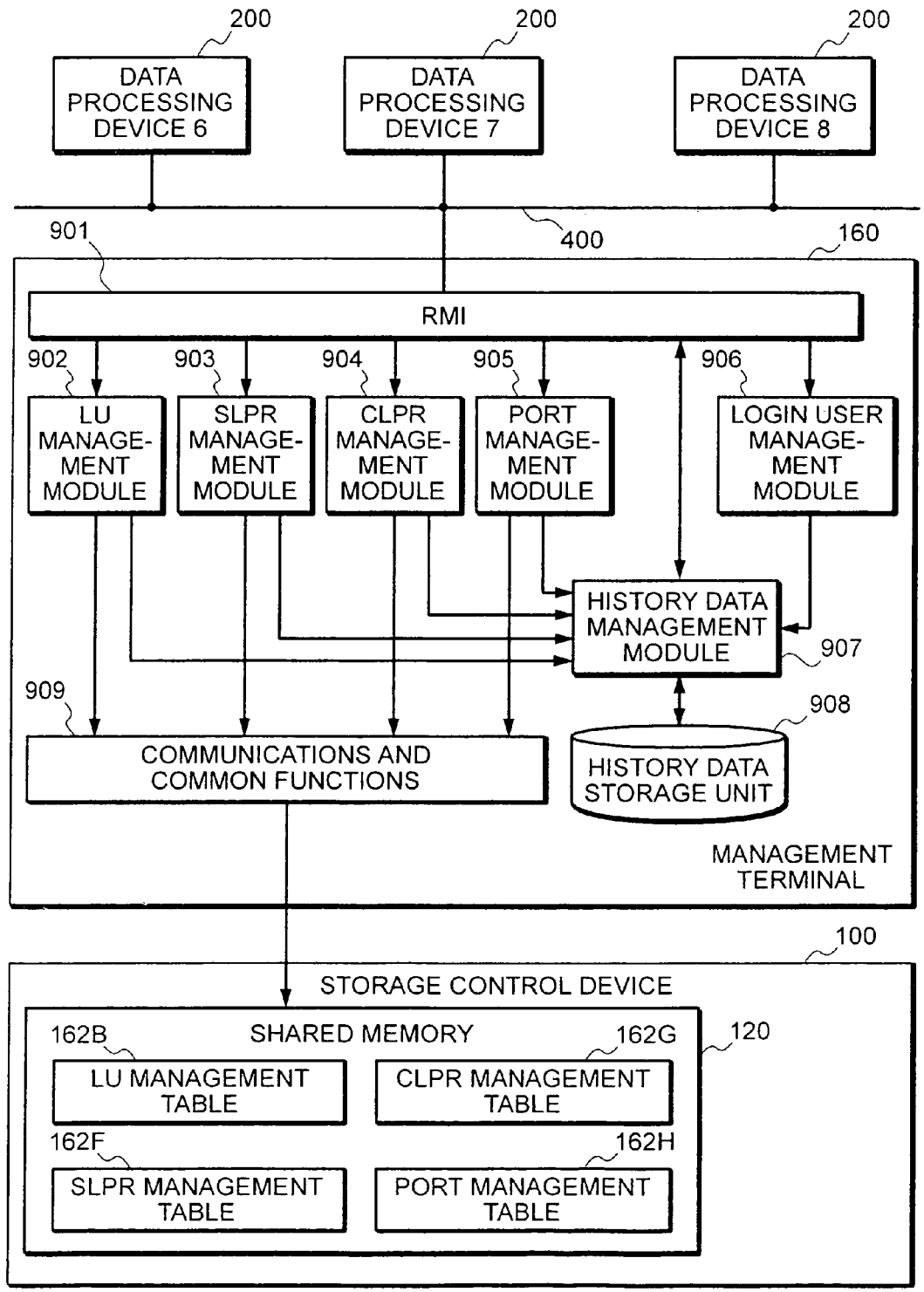
FIG. 15 indicates a summary of modifying the configuration of the various types of setting contents of the memory resources.

Further, the other tables memorized in the memory 162 of the management terminal 160 (the user management table 162D, the user correspondence table 162E, the SLPR management table 162F, the CLPR management table 162G, and the port management table 162H) will be described later. Further, the LU management table 162B, the SLPR management table 162F, the CLPR management table 162G, and the port management table 162H are management data of the communications ports assigned to each user using a data processing device 200, and of the memory resources comprising the physical disk drive 330 and the cache memory 130, and as indicated in FIG. 15, are memorized in the shared memory 120. Duplicates of these various types of tables are memorized in the memory 162 of the management terminal 160.

The recording medium read device 164 is a device for reading the programs and data recorded on a recording medium 167. The programs and data that have been read are stored in the memory 162 and the memory device 168. For example, using the recording medium read device 164, the storage management program 162C recorded on the recording medium 167 can be read from the recording medium 167 and stored into the memory 162 and the memory device 168. A flexible disk, CD-ROM, or semiconductor memory, etc. may be used as the recording medium 167. The recording medium read device 164 may be built into the management terminal 160, or may be externally attached. The memory device 168, for example, is a hard disk device or a semiconductor memory device. The input device 165 is a user interface used by the operator, etc. for entering data into the management terminal 160. For example, a keyboard and mouse, etc. may be used as the input device 165. The output device 166 is a user interface used in order to output data externally. For example, a display and printer, etc. may b used as the output device 166. The port 163 is connected to an internal LAN 151. The management terminal 160 can thereby communicate with the channel control unit 110 and the disk control unit 140, etc. Moreover, the port 163 is also connected to the connection unit 150. The management terminal 160 can thereby write and read data to the shared memory 120 and the cache memory 130. In addition, the port 163 is also connected to the LAN 400. The management terminal 160 can thereby communicate with the data processing devices 6 through 8 (200).

FIG. 5 indicates the system configuration of the channel control unit 110. The channel control unit 110 is configured as a board made into a single unit comprising a circuit substrate 118. The channel control unit 110 is configured comprising one or a plurality of circuit substrates 118. A processor 119, a protocol chip 115, a DMA (Direct Memory Access) 114, a memory 117, a memory controller 111, and a connector 116 are formed on the circuit substrate 118.

The protocol chip 115 provides communication interface functions for communicating between data processing devices 200. For example, the receiving of data input/output requests transmitted from the data processing devices 200, and the transceiving of data are controlled by following the fiber channel protocol. The connector 116 connected with the protocol chip 115 configures a communications port communicably connected with any of the plurality of data processing devices 200. The processor 119, the memory 117, the DMA 114 and the memory controller 111 receive data input/output requests through the communications port from the data processing devices 200 with regard to data memorized on the physical disk drive 330, and data and commands are transferred between the disk control unit 140, the cache memory 130, the shared memory 120, and the management terminal 160. Based on instructions from the processor 119, the DMA 114 forwards data transmitted from the data processing devices 200 to the cache memory 130, and transmits data memorized in the cache memory 130 to the data processing devices 200. The connector 116 connected with the DMA 114 is mated with the connector of the storage control device 100 side, and the channel control unit 110 is thereby electrically connected with the connection unit 150 of the storage control device 100 and with the management terminal 160, etc.

Figure 6:
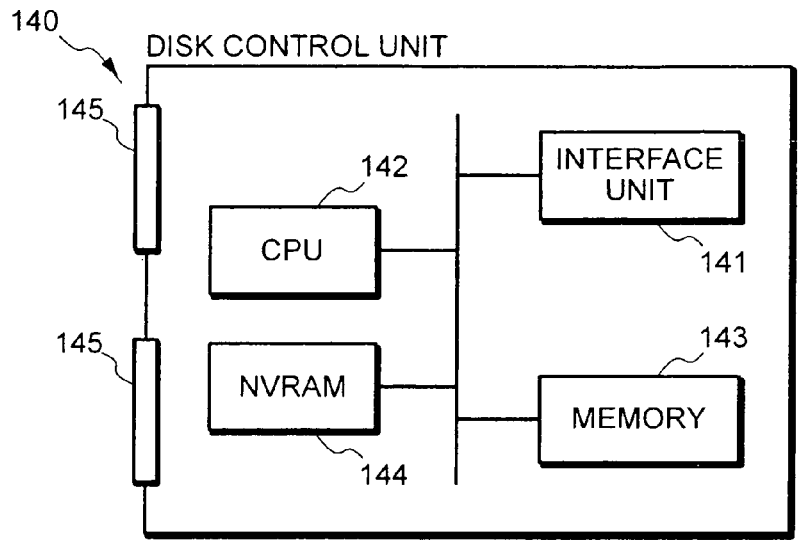
FIG. 6 is a system configuration diagram of the disk control unit.

FIG. 6 indicates the system configuration of the disk control unit 140. The disk control unit 140 comprises an interface unit 141, a memory 143, a CPU 142, a NVRAM (nonvolatile random-access memory) 144, and a connector 145, and these are formed into a single unit.

The interface unit 141 comprises a communications interface for communicating between the channel control units 110 through the connection unit 150, and a communications interface for communicating between the storage drive devices 300. The CPU 142 controls the entire disk control unit 140, and communicates between the channel control unit 110, the storage drive device 300, and the management terminal 160. The functions of the disk control unit 140 are realized by the CPU 142 executing various types of programs stored in the memory 143 and the NVRAM 144. The NVRAM 144 is nonvolatile memory that stores the programs that control the CPU 142. The contents of the programs memorized in the NVRAM 144 can be written and overwritten based on instructions from the management terminal 160. The disk control unit 140 comprises the connector 145. The connector 145 mates with the connector of the storage control device 100 side, and the disk control unit 140 is thereby electrically connected with the connection unit 150 of the storage control device 100, the storage drive device 300, and the management terminal 160, etc.

Figure 7:
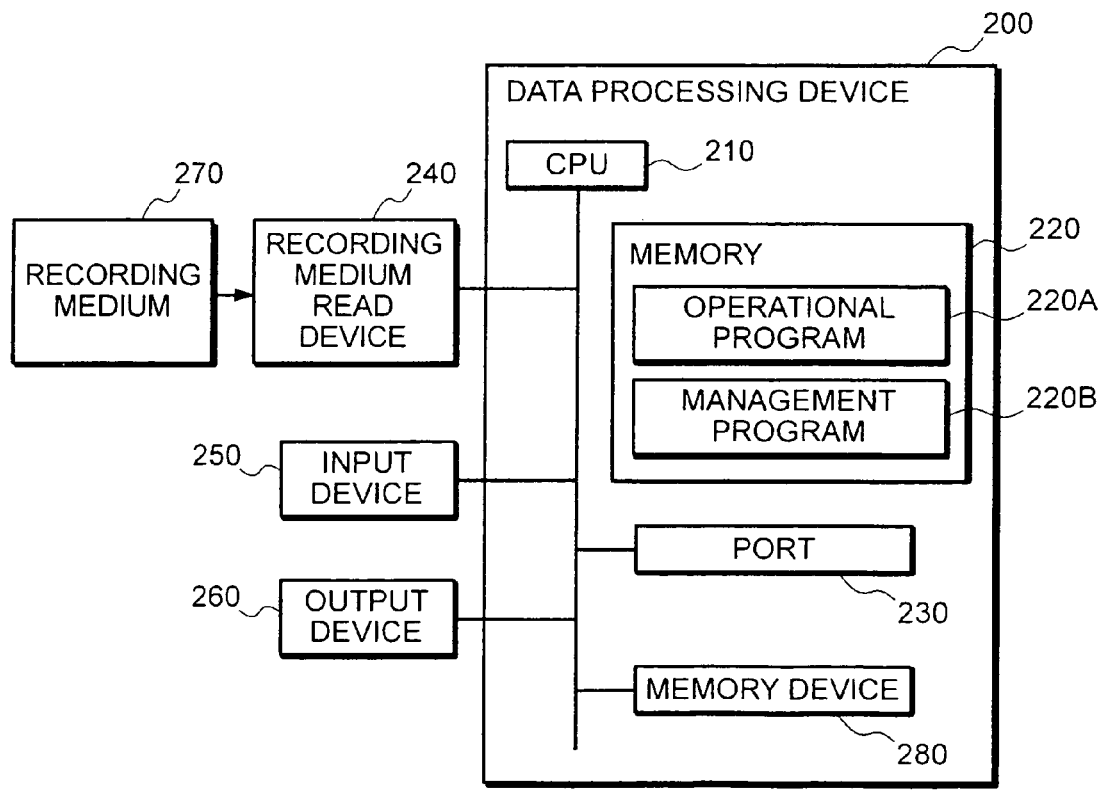
FIG. 7 is a system configuration diagram of the data processing device.

FIG. 7 indicates the configuration of the data processing device 200. The data processing device 200 comprises a CPU 210, a memory 220, a port 230, a recording medium read device 240, an input device 250, an output device 260, and a memory device 280.

The CPU 210 conducts the overall control of the data management device 200, and realizes various functions by executing operational programs 220A and the management programs 220B configured from code memorized in the memory 220 for executing various types of operations. For example, the provision of a data processing service such as the aforementioned bank automatic deposit and payment service, etc. is realized by the CPU 210 executing an operational program 220A. Moreover, the display of the previously described Web page provided by the Web server that operates by the management terminal 160, the modifying of the configuration of the physical disk drive 330, the setting of the path that is the communications route between the data processing device 200 and the channel control unit 110, and the setting of the logical volume 310, etc. are possible based on the CPU 210 executing a management program 220B. The recording medium read device 240 is a device for reading the programs and data recorded on a recording medium 270. The programs and data that have been read are stored in the memory 220 and the memory device 280. For example, using the recording medium read device 240, the operational programs 220A and management programs 220B recorded on the recording medium 270 can be read from the recording medium 270 and stored into the memory 220 and the memory device 280. A flexible disk, CD-ROM, or semiconductor memory, etc. may be used as the recording medium 270. The recording medium read device 240 may be built into the data processing device 200, or may be externally attached. The memory device 280, for example, is a hard disk device or a semiconductor memory device, etc. Further, the memory device 280 may be built into the data processing device 200, or may be externally attached. If externally attached, the memory device 280 of another data processing device 200 connected through a communications network is also possible. Moreover, the storage system 600 connected through the SAN 500 is also possible.

The input device 250 is a user interface that the operator, etc. who manipulates the data processing device 200 uses in order to enter data into the data processing device 200. For example, a keyboard and a mouse, etc. may be used as the input device 250. The output device 260 is a user interface for outputting data externally. For example, a display or printer, etc. may be used as the output device 260. The port 230 may be a device for communicating with the storage control device 100 through the SAN 500. In this case, the port 230 may be configured by an HBA (Host Bus Adapter). Moreover, the port 230 may be a device for communicating with another data processing device 200 through a communications network such as the LAN 400. In this case, for example, an operational program 220A or a management program 220B can be received from the other data processing device 200 through the port 230, and memorized in the memory 220 or the memory device 280.

Further, indicated in the same figure is an example of both the operational program 220A and the management program 220B being stored in the memory 220, but only one or the other may be stored in the memory 220. For example, only the operational program 220A for the data processing devices 1 through 5 (200) in FIG. 1, may be stored in the memory 220, or only the management program 220B for the data processing devices 6 through 8 (200) may be stored in the memory 220.

The storage system 600 is jointly used by a plurality of users to execute system operations. Specifically, various users jointly use the communication port, and the memory resources such as the physical disk drive 330 and the cache memory 130 that the storage system 600 provides. Each user uses the various memory resources within the range assigned to that user. The partition manager sets various kinds of settings for using the storage system 600 within the range of the memory resources assigned to each user. For example, [the partition manager executes] sets the logical volume in relation to the physical disk drive 330 assigned to the various users, and sets the path that is the communications route for accessing the logical volume from the data processing devices 200 of the various users. The system manager manages the overall system use of the storage system 600. The system manager is, for example, an employee, etc. of the storage service provider.

Figures 8, 9:
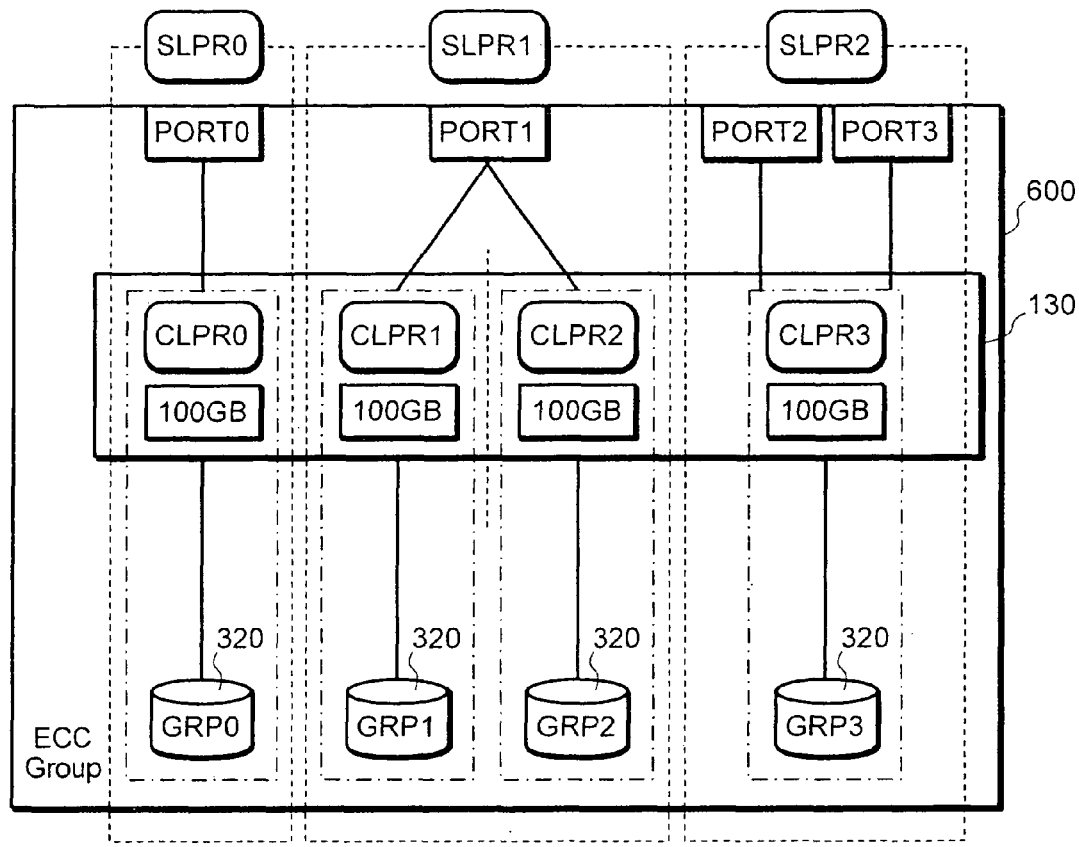
FIG. 8 is an explanatory diagram summarizing the partition of the memory resources in the storage system.
FIG. 9 indicates the CLPR management table.

FIG. 8 indicates a summary of the partition of the memory resources of the storage system 600. In the storage system 600, users are assigned memory resources in groups called SLPR. For example, SLPR0 may be assigned to user A, SLPR1 to user B, and SLPR2 to user C respectively. Moreover, all SLPRs are assigned to the system manager.

FIG. 14 indicates the user correspondence table 162E when assigning the various memory resources as described above. Communications ports and CLPRs are correlated to the various SLPRs. In the example indicated in FIG. 8, PORT0 (communications port 0) and CLPR0 are assigned to SLPR0; PORT1 (communications port 1), CLPR0 and CLPR2 are assigned to SLPR1; and PORT2 (communications port 2), PORT3 (communications port 3), and CLPR3 are assigned to SLPR2. The ECC group 320 and the memory capacity that can be memorized in the cache memory 130 from among the data memorized in the ECC group 320 are correlated to the various CLPR. In the example in FIG. 8, ECC group 0 and a memory capacity of 100 GB of cache memory 130 are assigned to CLPR0, ECC group 1 and a memory capacity of 100 GB of cache memory 130 are assigned to CLPR1, ECC group 2 and a memory capacity of 100 GB of cache memory 130 are assigned to CLPR2, and ECC group 3 and a memory capacity of 100 GB of cache memory 130 are assigned to CLPR3.

Based on the assignments described above, company A uses the PORT0, and can use the physical disk drive 330 of the ECC group 0, and 100 GB of cache memory 130. Company B uses the PORT1, and can use the physical disk drive 330 of the ECC group 1, the physical disk drive 330 of the ECC group 2, and the 100 GB of cache memory 130 assigned to each of the respective physical disk drives 330. Company C uses the PORT2 and the PORT3, and can use the physical disk drive 330 of the ECC group 3, and 100 GB of cache memory 130.

FIG. 9 indicates the CLPR management table 162G. This table 162G is a table that makes a correspondence between the ECC group 320 assigned to each CLPR and the memory capacity of the cache memory 130. An "Identifier" column, a "Cache Capacity" column, an "ECC Group" column, and an "Assigned SLPR Identifier" column are defined in this table 162G. The CLPR group identifier is set up in the "Identifier" column. The memory capacity of the cache memory 130 assigned to each CLPR is set up in the "Cache Volume" column. The identifier of the ECC group 320 assigned to each CLPR is set up in the "ECC Group" column. The SLPR identifier that the CLPR is assigned is set up in the "Assigned SLPR Identifier" column.

Further, the "ECC Group" column is defined in the physical disk drive management Table 162A indicated in FIG. 3. For this reason, to which CLPR group and to which SLPR group a physical disk drive 330 belongs can be correlated by referring to the physical disk drive management table 162A and the CLPR management table 162G.

Moreover, the "Assigned CLPR" column is defined by the LU management table 162B indicated in FIG. 4. Each CLPR group can be correlated thereby to the logical volume logically defined by the ECC group 320 assigned to that CLPR group. Here, the logical volume can be set by the partition manager that manages the memory resources of the storage system 600 assigned to that manager.

In the storage system 600, the memory capacity of the cache memory 130 is assigned to the various CLPR. By assigning the memory capacity of the cache memory 130 to the various CLPR, the users jointly using the storage system 600 can use the cache memory 130 within the ranges assigned to each without being affected by the uses of the storage system 600 by other users. Specifically, in the storage system 600, a partition even of the cache memory 130 can be offered to each user. For this reason, even if a plurality of users jointly use the storage system 600, the cache hit percentage of each user is not affected by the use of the storage system 600 by other users, thus enabling storage consolidation that can offer independent memory resources without a dependent relationship between users.

The cache memory 130, as indicated in FIG. 10, is configured to have a control region and a data region because the memory capacity of the cache memory 130 is assigned to the various CLPRs. The data region is a region for memorizing data (for example, write data that is written to the physical disk drive 330, or read data read from the physical disk drive 330, etc.). The data region, as with normal cache memory, has addresses added for every specified block data length. Meanwhile, in the control region, the data block numbers in use are written to every CLPR. The number of data blocks assigned to each CLPR is adjusted corresponding to the memory capacity of the cache memory 130 assigned to each CLPR. Here, CLPR 0 to 3 are all assigned a memory capacity of 100 GB, and therefore, in the example indicated in FIG. 10, all have been assigned the same number of data blocks. The number of data blocks assigned to each CLPR can be modified, for example, by instructions from the management terminal 160.

FIG. 11 indicates the SLPR management table 162F. This table 162F is a table indicating the SLPR group assignments, and is defined by a "Usable CU Number" column, and a "Usable SSID" column. In the "Usable CU Number" column, the number of the CU (Control Unit) assigned to each SLPR is set. CU refers to the logical storage system 600 set up in the storage system 600, and in relation to the data processing devices 200 [the logical storage system 600] behaves as if every CU were an independent storage system 600. The SSID (Storage Subsystem Identification) number assigned to each SLPR is set in "Usable SSID" column. SSIDs are the identifiers by which one LDEV (Logical DEVice) number, which is logically set up for each ECC group 320, is set to each fixed number of divisions.

Further, it is possible that only one or the other of the "Usable CU Number" column and the "Usable SSID" column may be used in the SLPR management table 162F. For example, if the data processing devices 1 though 5 (200) are mainframe computers, then only the "usable SSID" column may be used. Moreover, if the data processing devices 1 though 5 (200) are open computers, then only the "usable CU number" column may be used.

FIG. 12 indicates the port management table 162H. This table indicates the assignments of the communications ports for each SLPR, and a "PORT Number" column and an "Assigned SLPR Identifier" column are defined. The identifier of the communications port is set in "PORT Number" column. The SLPR identifier to which that communications port is assigned is set in the "Assigned SLPR Identifier" column.

The memory resources that the storage system 600 comprises can be partitioned, and the partitioned memory resources can be assigned to users by using the tables described above.

By operating the data processing devices 6 though 7 (200), the various partition managers can access the management terminal 160 via the LAN 400, and can modify the configuration of the memory resources within the storage system 600 (for example, modify the various types of tables described above). By operating the data processing device 8 (200), the system manager can access the management terminal 160 via the LAN 400, and can modify the configuration of the memory resources within the storage system 600.

FIG. 15 indicates the schema by which the various partition managers or the system manager modifies the configuration of the various types of setting contents for the memory resources. The management terminal 160 comprises an RMI (Remote Method Invocation) 901, an LU management module 902, an SLPR management module 903, a CLPR management module 904, a port management module 905, a logged-in user management module 906, a history data management module 907, a history data storage unit 908, and a communications and common functions 909. The CPU 161 executes the storage management program 162C to realize these module functions. The LU management module 902 is a module for managing the configuration data of the LU, and for example, sets up or modifies, etc. the LU management table 162B. The SLPR management module 903 is a module for managing the configuration data of the SLPRs, and for example, sets up or modifies the SLPR management table 162F. The CLPR management module 904 is a module for managing the configuration data of the CLPRs, and for example, sets up or modifies the CLPR management table 162G. The port management module 905 is a module for managing the configuration data of the ports, and for example, sets up or modifies the port management table 162H.

A plurality of users may simultaneously login to the management terminal 160. For example, user A, user B, and the systems manager may simultaneously login to the management terminal 160 by operating the respective data processing devices 6 through 8 (200). Here, if a plurality of users are logged in, only the first user to acquire Modify Mode (permitted to modify the configuration) is permitted to modify the configuration of the memory resources, and the other users are permitted to reference the log data. The logged-in user management module 906, as indicated in FIG. 16, assigns IDs (identification data) to each logged-in user in login order, and correlates and maintains the "ID", the "User Name", and the "SLPR number (partition manager number)". The RMI 901 invokes the modules 902 to 905 following the instructions from the logged in user to modify the configuration. When the ID and modify contents (setting contents) are delivered, the modules 902 to 905 modify the configuration following the modify contents that have been received, and deliver the login data and the setting data to the history data management module 907. The history data management module 907 receives the correlation of the ID, user name, and SLPR number from the logged-in user management module 906, and receives the login data and setting data from the modules 902 to 905, produces history data from these data, and stores this in the history data storage unit 908. The modified configuration of the modules 902 to 905 is transmitted to the storage control device 100 through the communications and common functions 909, updates the LU management table 162B, the SLPR management table 162F, the CLPR management table 162G, and the port management table 162H within the shared memory 120.

FIG. 17 indicates the login data of the various logged in users. The login data comprises the "ID", "Login Date", "Time", "Time Zone", "Function", "IP Address", and "Results". The "ID" is the identification number that identifies the logged in user. The "Login Date" indicates the date of logging in, and the "Time" indicates the time of logging in. The "Time Zone" indicates the Greenwich Mean Time, etc. The "Function" indicates any of login (Login), logout (Logout), and modify configuration (Modify). The "IP Address" is the IP address of the login terminal of the data processing devices 6 through 8 (200). The "Results" indicates whether or not the log operation was executed normally. "Normal" indicates the completion of a normal login operation. "Error" indicates the abnormal completion by an error login operation.

FIG. 18 indicates the settings data of the logged in user. The settings data comprises the "ID", "Modification Date", "Modification Time", "Time Zone", "Function", "Operation", and "Results". The "Modification Date" indicates the date the configuration was modified, and the "Modification Time" indicates the time of modifying the configuration. The "Function" indicates the contents of the configuration modification (setting contents or operation contents).

FIG. 19 indicates the history data of all logged-in users. The history data is login data and setting data collected from the modules 902 to 905, and the ID is modified into a combination of the user name and the SLPR number. The history data of all logged in users is stored in the history data storage unit 908 as a log file.

FIG. 20 indicates a flowchart describing the procedure by which all managers modify the configuration of the memory resources. First, the data processing device 8 (200) receives the user ID and password of the system manager that are input through the user interface (S1000). Then, the user ID and password are relayed through the LAN 400 and transmitted to the management terminal 160 (S1001). The management terminal 160 refers to the user management table 162D indicated in FIG. 13, and verifies the user (S1002). The user management table 162D is memorized in the memory 162. A "User ID" column, "User Name" column, "Password" column, and "Remarks" column are defined in the user management table 162D. The identifier of the partition manager or of the system manager is set up in the "User ID" column. The name of the partition manager or of the system manager is set up in the "User Name" column. The password of the partition manager or of the system manager is set up in the "Password" column. Notes are set up in the "Remarks" column as necessary. Verifying the partition manager or system manager in this way can prevent the erroneous modification of the configuration of the storage system 600 by a third party in the place of the partition manager or system manager.

The management terminal 160 returns the verification results to the data processing device 8 (200) (S1003). If the data processing device 8 (200) receives verification as the system manager from the management terminal 160 (S1004; Yes), a partition definition screen is displayed (S1005). The partition definition screen may be displayed by displaying a Web page transmitted from the management terminal 160. FIG. 21 indicates an example of a partition definition screen. As described above, all of the SLPRs are assigned to the system manager, and all of the assigned memory resources can be referenced and updated by the system manager. The system manager enters the SLPR and CLPR settings from the partition definition screen. When clicking the "OK" tab on the partition definition screen, the setting contents that the system manager input are received by the data processing device 8 (200) (S1006). Then, the data processing device 8 (200) transmits those contents to the management terminal 160 (S1007).

Then, the management terminal 160 modifies the configuration of the modules 902 to 905 (S1008), and the contents of the LU management table 162B, the SLPR management table 162F, the CLPR management table 162G, and the port management table 162H stored in the shared memory 120 are updated (S1009). Next, the LU management table 162B, the SLPR management table 162F, the CLPR management table 162G, and the port management table 162H are read from the shared memory 120, and the contents of these tables that are memorized in the memory 162 of the management terminal 160 are updated (S1010). Thereafter, the management terminal 160 transmits notification of completion of setting to the data processing device 8 (200) (S1011). With the above processing, the system manager can partition and assign the memory resources of the storage system 600.

Further, the example was given here of using the data processing device 8 (200) to set the SLPR and CLPR, but modification of the configuration may also be set from the management terminal 160.

Figure 22:
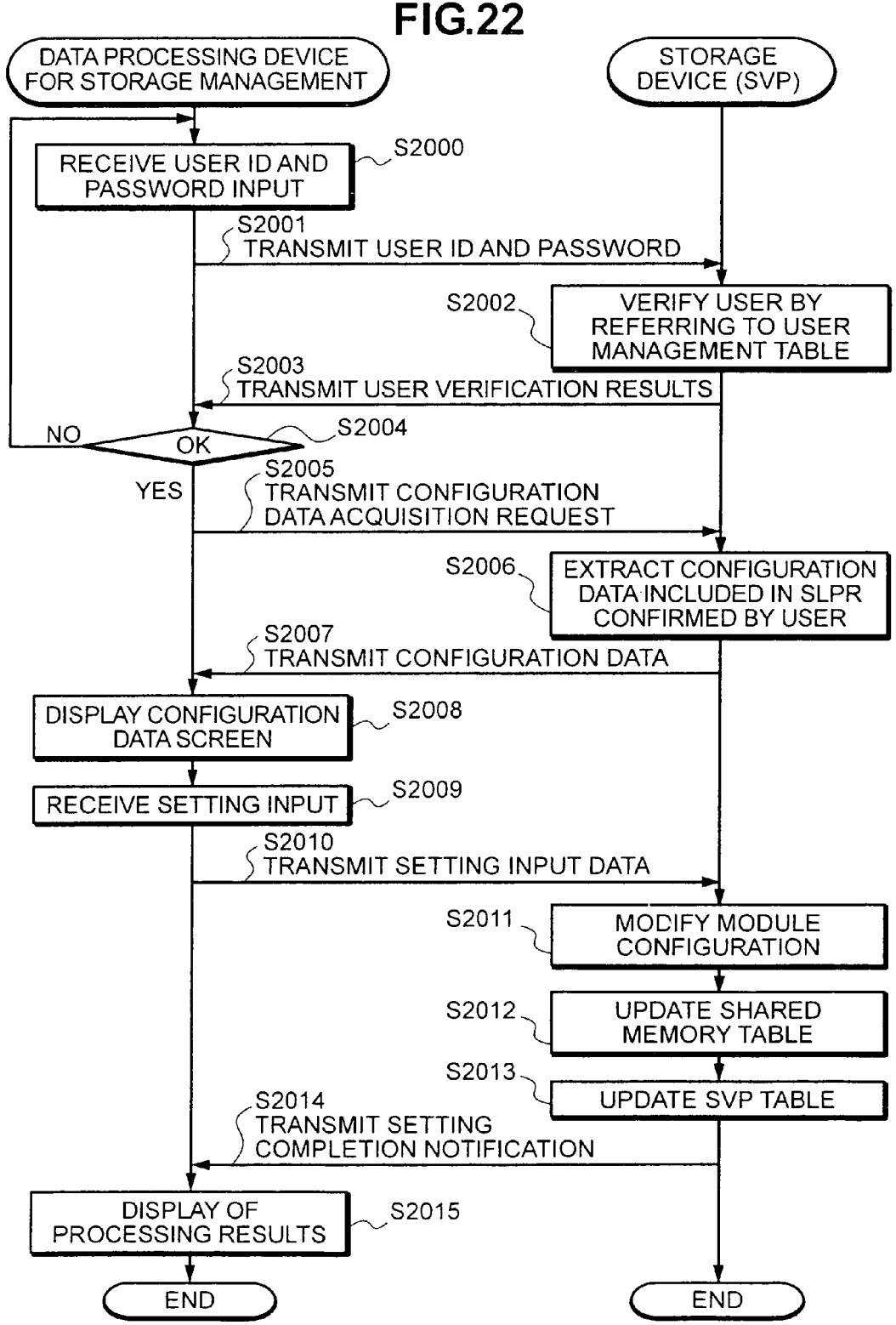
FIG. 22 is a flowchart in order for the partition manager to modify the configuration of the memory resources.

FIG. 22 indicates a flowchart that describes the procedure of the partition manager when modifying the configuration of the memory resources assigned to that particular manager. Here, the example will be explained with user A as the partition manager. First, the data processing device 6 (200) receives the user ID and password that are input through the user interface (S2000). Then, the user ID and password are relayed through the LAN 400 and transmitted to the management terminal 160 (S2001). The management terminal 160 refers to the user management table 162D memorized in the memory 162, and verifies the user (S2002). The management terminal 160 then returns the verification results to the data processing device 6 (200) (S2003). If the data processing device 6 (200) receives verification as the partition manager from the management terminal 160 (S2004; Yes), a configuration data acquisition request is transmitted to the management terminal 160 (S2005). The configuration data acquisition request is a command to acquire the management data of the memory resources assigned to the various users. When a configuration data acquisition request is received, the management terminal 160 references the user correspondence table 162E, the LU management table 162B, the SLPR management table 162F, the CLPR management table 162G, and the port management table 162H memorized in the memory 162, and extracts the assigned data of the memory resources comprising the identifier of the communications port assigned to the related user, the identifier of the physical disk drive 330, and the memory capacity of the cache memory 130 (S2006), and transmits the data to the data processing device 6 (200) (S2007).

Figure 23:
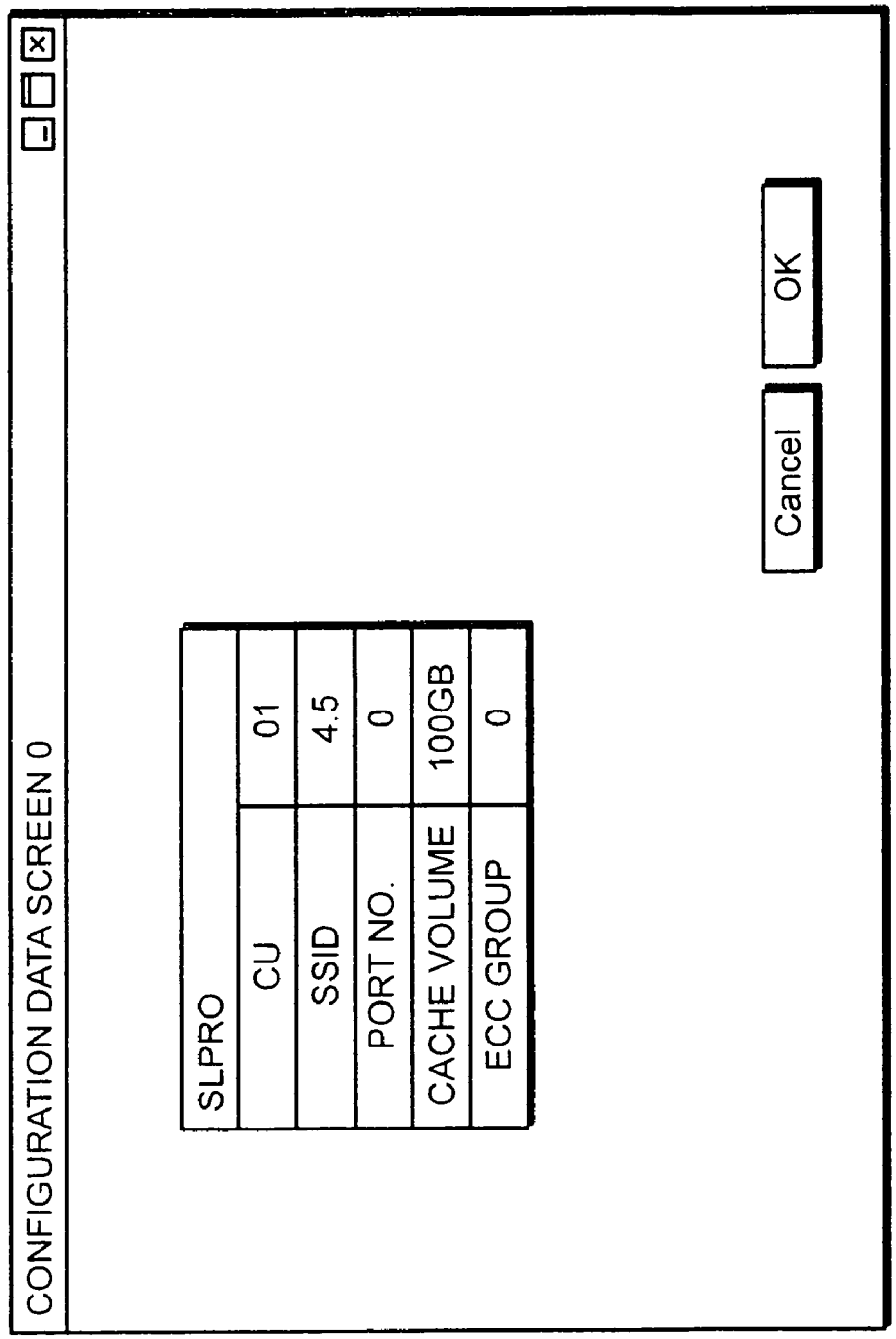
FIG. 23 is an explanatory diagram of the configuration data screen.

Then, data processing device 6 (200) displays the configuration data screen to the user interface (S2008). The configuration data screen can be displayed, for example, by displaying a Web page transmitted from the management terminal 160. An example of a configuration data screen is indicated in FIG. 23. This figure displays the memory resource assignment data of SLPR0 assigned to the user A. The partition manager can reference and update the assignment data of the memory resources assigned to that particular manager from among the memory resources that the storage system 600 comprises. Assignment data of memory resources not assigned to that particular manager are not displayed on the configuration data screen. The partition manager can set the SLPR and CLPR assigned to that particular manager based on the memory resource assignment data displayed on the configuration data screen. Moreover, by incorporating these data in the storage management program 162C, within the range of the memory resources assigned to that particular manager, the partition manager can perform various types of operations to make settings such as setting the logical volume 310 in relation to the physical disk drive 330, setting the logical volume that can be accessed from the data processing device 200 of that particular company, or setting the path that is the communications route from the data processing device 200 of that particular company to the storage control device 100. When clicking the "OK" tab on the configuration data screen, the setting contents that the partition manager input are received by the data processing device 6 (200) (S2009). Then, the data processing device 6 (200) transmits those setting contents to the management terminal 160 (S2010).

Then, the management terminal 160 modifies the configuration of the modules 902 to 905 (S2011), and the contents of the LU management table 162B, the SLPR management table 162F, the CLPR management table 162G, and the port management table 162H stored in the shared memory 120 are updated (S2012). Next, the LU management table 162B, the SLPR management table 162F, the CLPR management table 162G, and the port management table 162H are read from the shared memory 120, and the contents of these tables memorized in the memory 162 of the management terminal 160 are updated (S2013). Thereafter, the management terminal 160 transmits notification of completion of setting to the data processing device 6 (200) (S2014), and the processing results are displayed (S2015). With the above processing, the partition manager can modify the configuration within the range of the memory resources assigned to that particular manager.

Figure 24:
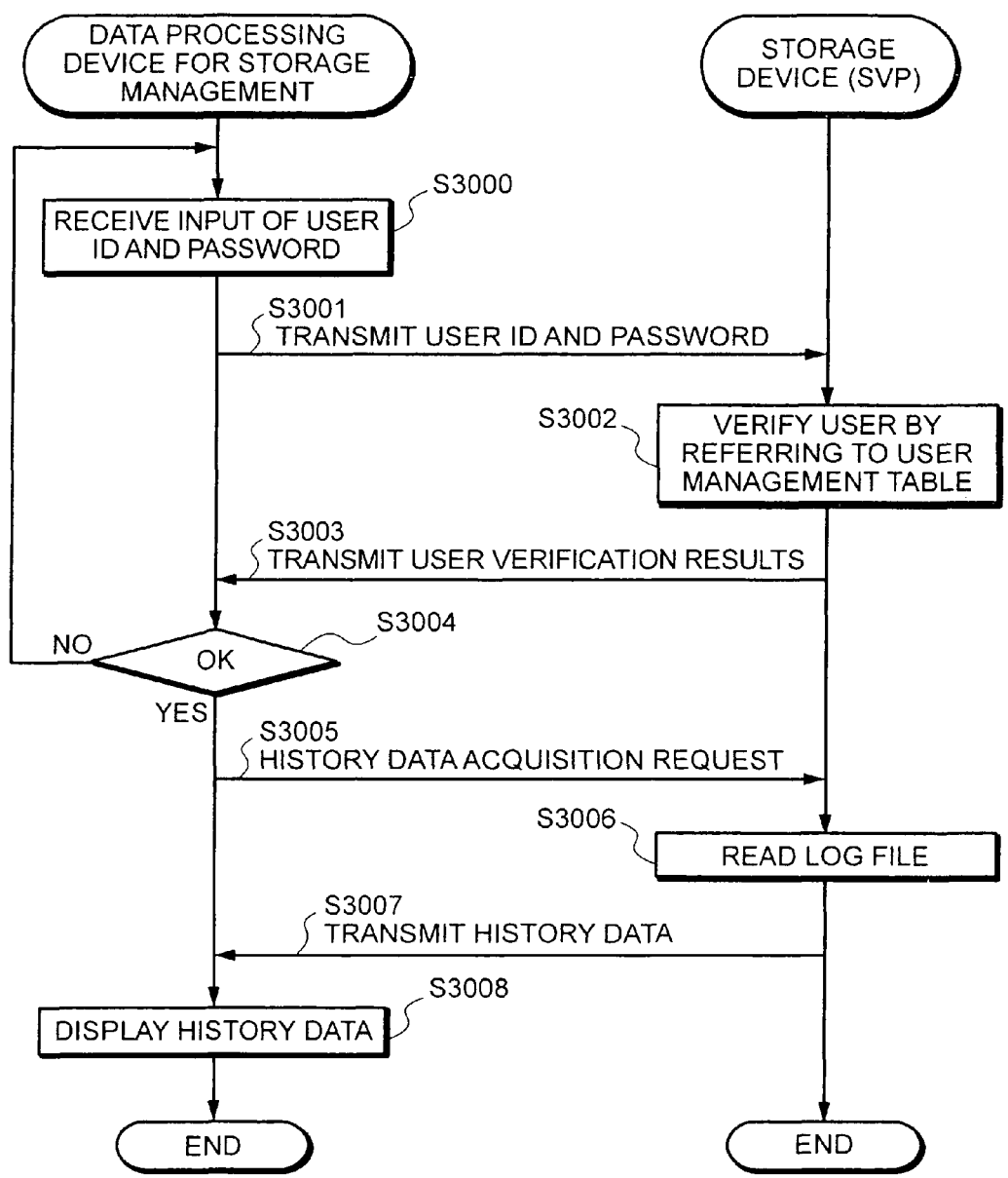
FIG. 24 is a flowchart in order for the system manager to reference all of the history data.

FIG. 24 indicates a flowchart that describes the order of the system manager referencing the history data of all logged-in users. First, the data processing device 8 (200) receives the user ID and password of the system manager that are input through the user interface (S3000). Then, the user ID and password are relayed through the LAN 400 and transmitted to the management terminal 160 (S3001). The management terminal 160 refers to the user management table 162D memorized in the memory 162, and verifies the user (S3002). The management terminal 160 returns the verification results to the data processing device 8 (200) (S3003). If the data processing device 8 (200) receives verification as the system manager from the management terminal 160 (S3004; Yes), a history data acquisition request is transmitted to the management terminal 160 (S3005). Then, the management terminal 160 reads the log file of all history data stored in the history data storage unit 908 (S3006), and transmits this to the data processing device 8 (200) (S3007). A history data screen like that indicated in FIG. 25 is displayed on the data processing device 8 (200) (S3008).

The display items on this history data screen correspond to the items of the history data, and comprise the user name, SLPR number, date, time, processing contents, and results, etc. Moreover, the items displayed on the history data screen conform to the basic format of the log data. The basic format of the log data can, for example, be defined as indicated in FIG. 30. The "Type" column in the history data screen in FIG. 25 corresponds to the "Results" column in the history data, and if there is an error log, then "Error" is displayed. Clicking the history data [column] displaying "Error" on the screen will display a window with the details of the error log, as indicated in FIG. 26. For example, the detailed format of the log data may be defined as indicated in FIG. 31. In this way, if the storage system 600 generates a failure, the system manager can investigate the cause thereof by displaying the detailed error log.

Figure 27:
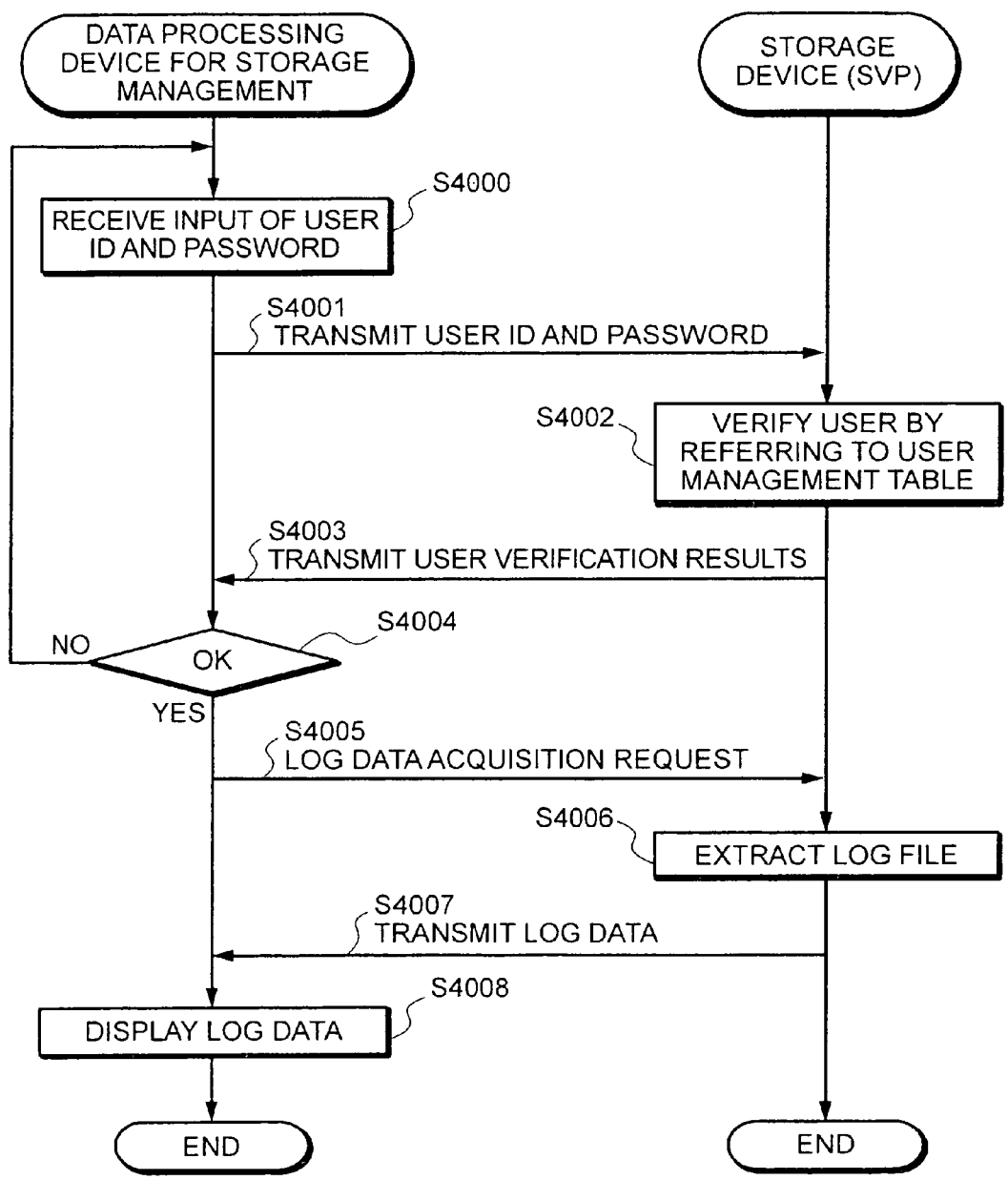
FIG. 27 is a flowchart in order for a partition manager to reference the log data of that particular manager.

FIG. 27 indicates a flow chart describing the procedure by which the partition manager references log data conducted by that particular manager. Here, the example will be explained with user A as the partition manager. First, the data processing device 6 (200) receives the user ID and password of the partition manager that are input through the user interface (S4000). Then, the user ID and password are relayed through the LAN 400 and transmitted to the management terminal 160 (S4001). The management terminal 160 refers to the user management table 162D memorized in the memory 162, and verifies the user (S4002). The management terminal 160 returns the verification results to the data processing device 6 (200) (S4003). If the data processing device 6 (200) receives verification as the partition manager from the management terminal 160 (S4004; Yes), a log data acquisition request is transmitted to the management terminal 160 (S4005). Then, the management terminal 160 reads only the log data of the related partition manager from among the log files of the history data stored in the history data storage unit 908 (S4006), and transmits this to the data processing device 6 (200) (S4007). A log data screen like that indicated in FIG. 28 is displayed on the data processing device 6 (200) (S4008). The display items of this log data screen correspond to the items of the history data, and conform to the basic format. Clicking the "Type" column displaying "Error" on the screen will display a window with the details of the error log, as indicated in FIG. 26.

In this way, the logs of the operations that the various managers have conducted are recorded as log files correlating both the user name and the contents of the settings. While a partition manager is restricted so that only the log of operations conducted by that particular manager can be referenced, the system is designed so that the system manager can reference the operational logs of the all the partition managers, and thus the system manager can suitably comprehend who, when and what kind of configurational modifications have been made to the memory resources. By this [design], if the storage system 600 generates a failure, what kind of operations generated the failure can be immediately discovered and suitable countermeasures can be taken. Moreover, a partition manager can confirm after the fact whether or not the log operation of that particular manager were conducted correctly, and the log data can be positioned as evidence that normal input operations were conducted.

Further, the display of log data is not limited to the screen displays as indicated in FIG. 25, FIG. 26, and FIG. 28, and, for example, may be the CSV format (Comma Separated Value Format) as indicated in FIG. 29.

Figure 32:
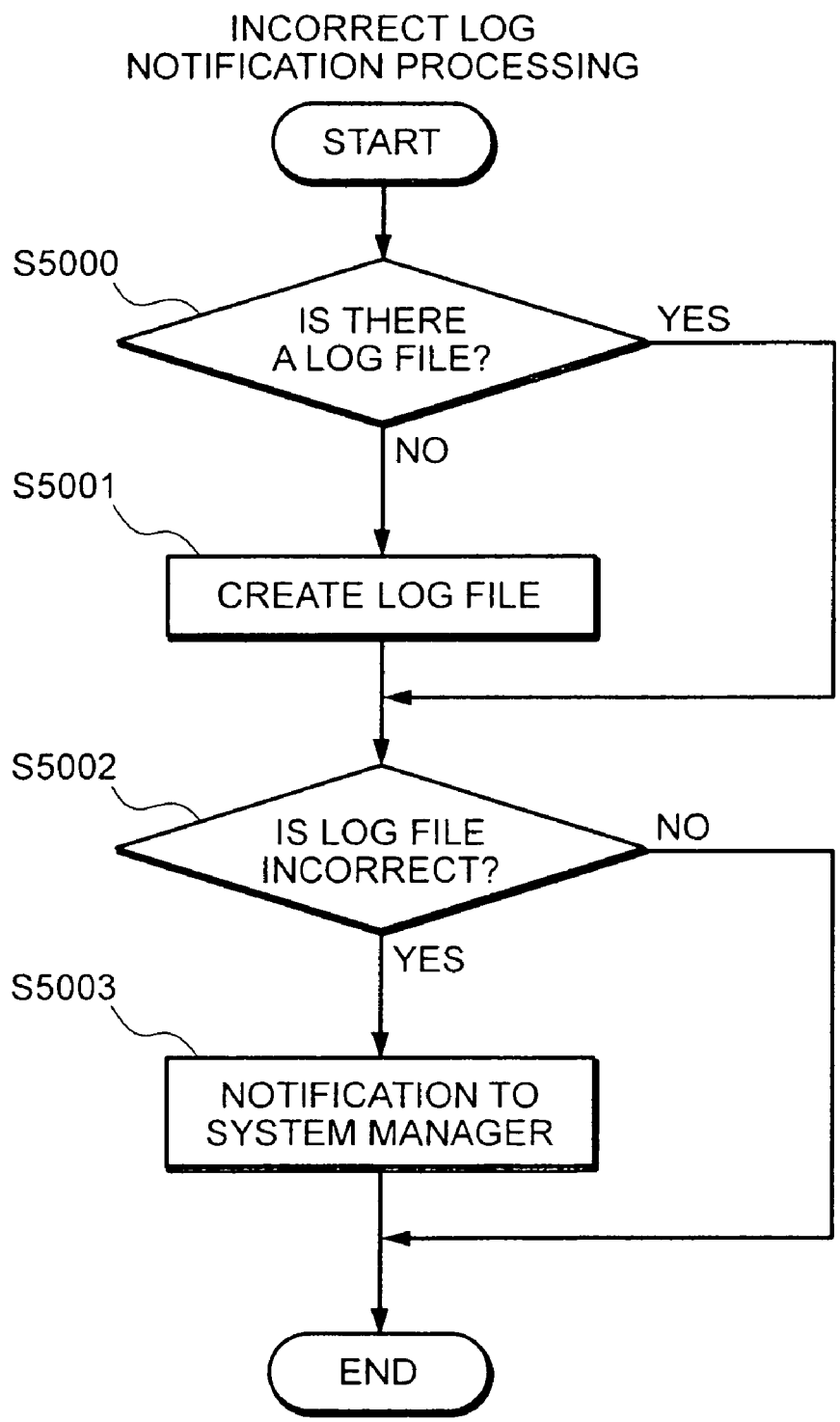
FIG. 32 is a flowchart describing the error log notification processing routine.

FIG. 32 indicates a flowchart to describe the error log notification processing routine. This routine is repeatedly executed at a fixed interval by the history data management module 907 of the management terminal 160. When this routine is invoked, the history data management module 907 checks whether or not the history data storage unit 908 has created a log file (S5000). If a log file has not been created (S5000; NO), login data and stetting data is collected from the modules 902 to 905, and a log file is created (S5001). Next, the history data management module 907 checks whether or not an error log is present in the log files (S5002). If an error log is present (S5002; YES), the system manager is notified of the presence of an error log (S5003). As a means to notify the system manager, for example, a warning lamp (not indicated in the figures) provided on the management terminal 160 may be made to flash, or a warning mail message may be sent to the data processing device 8 (200). A failure that the storage system 600 could generate may be prevented beforehand by constructing a system in which the system manager can discover the presence of an error log at an early stage.

Figure 33:
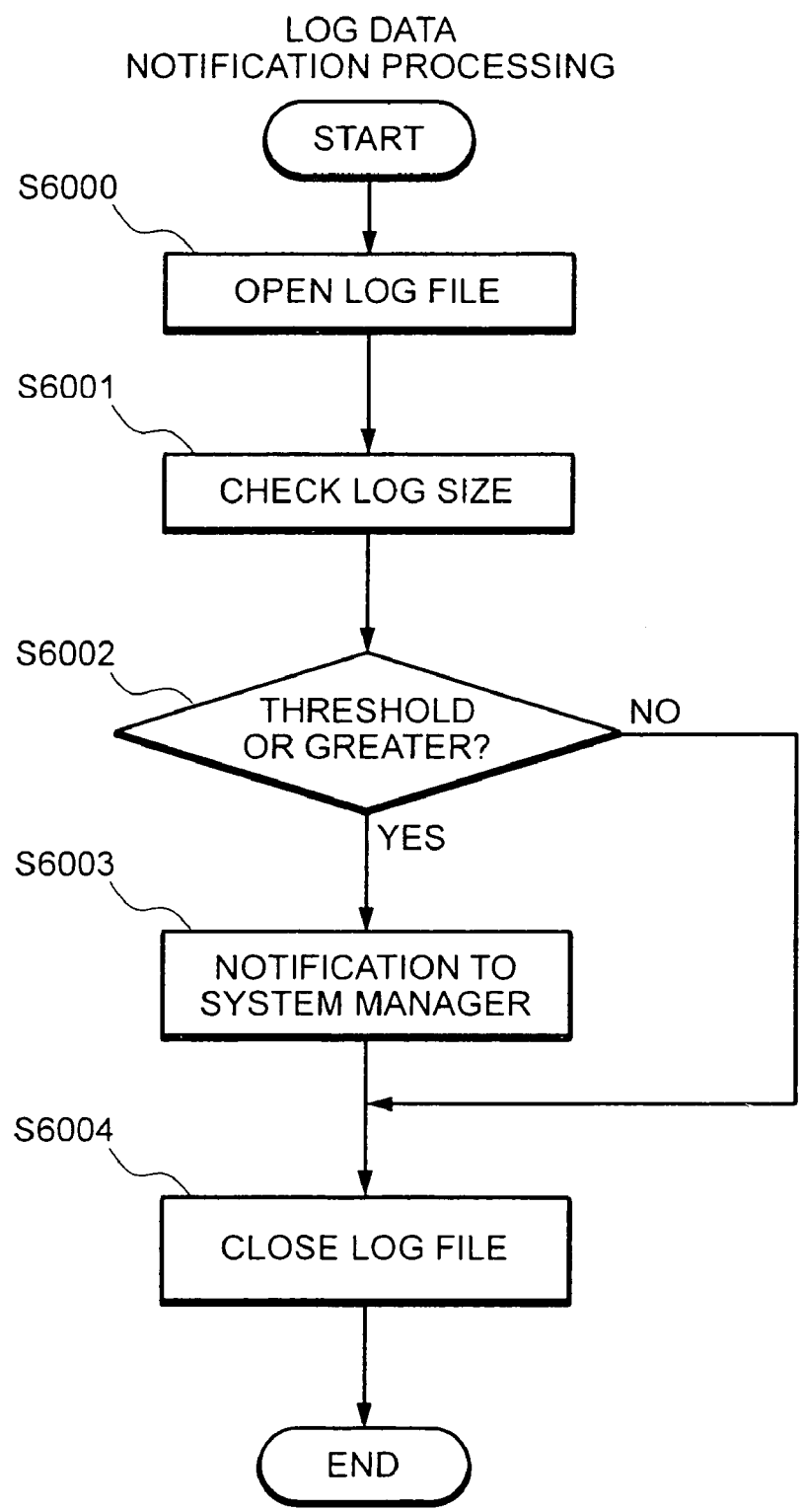
FIG. 33 is a flowchart describing the log data notification processing routine.

FIG. 33 indicates a flowchart describing a log data notification processing routine. This routine is repeatedly executed at a fixed interval by the history data management module 907 of the management terminal 160. When this routine is invoked, the history data management module 907 opens a log file stored in history data storage unit 908 (S6000), checks the log size (S6001), and then checks whether or not the log size exceeds the threshold value (for example, the permissible maximum number of cases) (S6002), and if the log size exceeds the threshold value (S6002; YES), then the system manager is notified thereof (S6003), and the log file is closed (S6004). The timing for judging whether or not the log size has exceeded the threshold value may be (A) when the log size has already exceeded [the threshold value] at the point of time that the system manager logs in; or, (B) when the log size exceeds the threshold value in the middle of the system manager being logged in. The system manager can thereby suitably collect the log data on the verge of wraparound.

Further, the system manager can set this threshold value in a suitable range. For example, by setting a large threshold value, a greater number of log cases can be accumulated, and the time until wraparound can be lengthened. Moreover, by setting a small threshold value, the time until wraparound can be shortened.

Moreover, it is preferable, for example, to design the system such that the log file stored in the history data storage unit 908 cannot be deleted or edited even by the system manager. This is for the purpose of preventing the wrongful falsification of log data, and realizing appropriate system operations. Moreover, preventing deletion and editing can heighten the reliability of the log file.

Further, in the explanation above, an example was given of modifying the configuration of the memory resources of the storage system 600 by accessing the management terminal 160 from the data processing devices 6 to 8 (200) by relaying through the LAN 400, but the present invention is not limited to this, and for example, the configuration of the memory resources of the storage system 600 may be modified by accessing the storage control device 100 from the data processing devices 1 through 5 (200) by relaying through the SAN 500.

Figure 34:
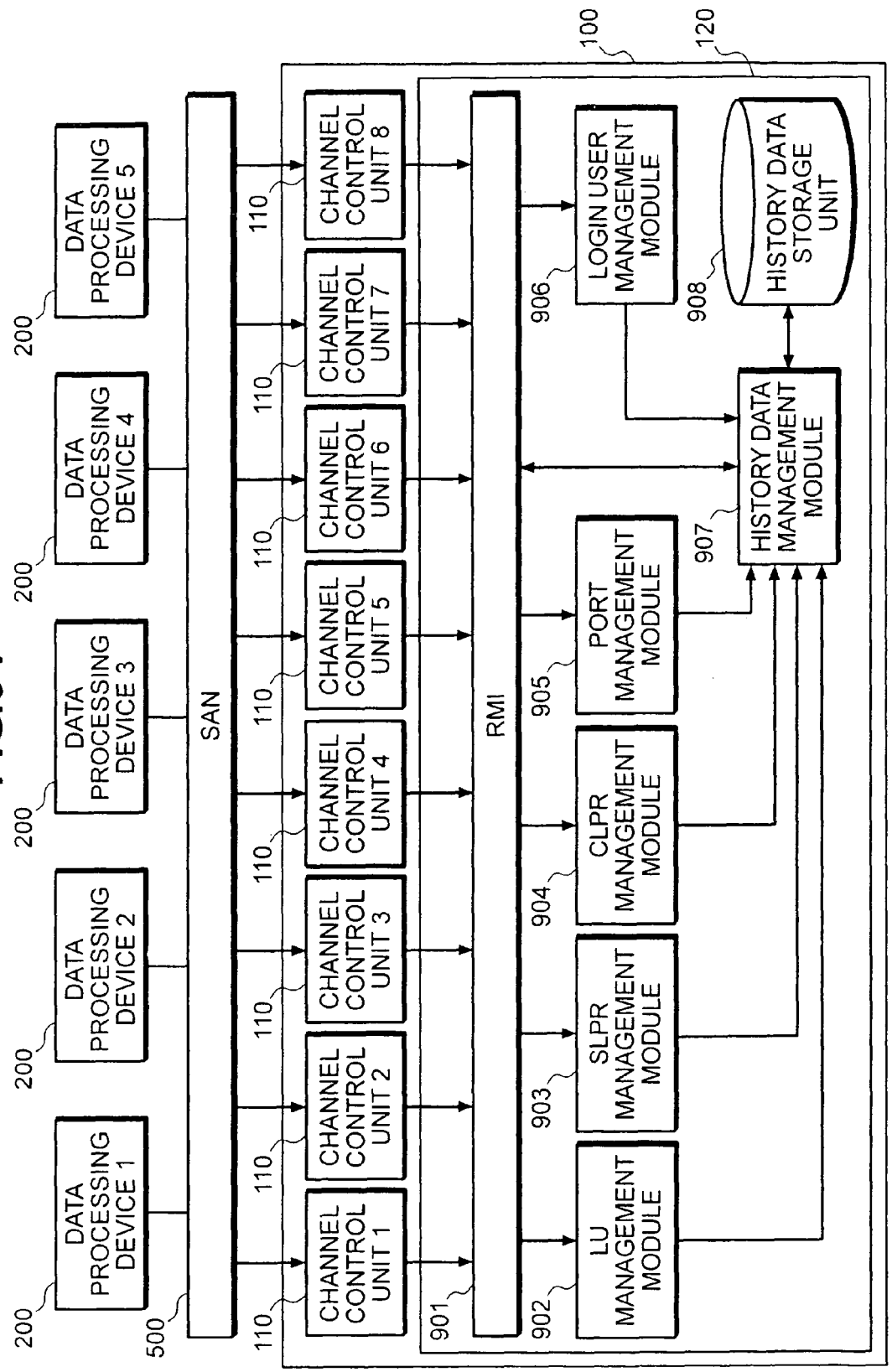
FIG. 34 is an explanatory diagram to summarize the modifying of the configuration of the memory resources.

FIG. 34 indicates a summary of modifying the configuration of the memory resources of the storage system 600 from the data processing devices 1 through 5 (200) by relaying through the SAN 500. In this figure, devices, etc. with the same codes as those in FIG. 1 or FIG. 15 indicate the same devices, etc, and a detailed explanation thereof will be omitted. Moreover, to simplify the explanation, the cache memory 130, the disk control unit 140, the physical disk 330, etc. have been omitted from the figure. The RMI 901, the LU management module 902, the SLPR management module 903, the CLPR management module 904, the port management module 905, the logged-in user management module 906, the history data management module 907, and the history data storage unit 908 are mounted in the shared memory 120 within the storage control device 100. For example, the configuration of the memory resources of the storage system 600 can be modified by the user A accessing the storage control device 100 from the data processing devices 1 through 2 (200) via a relay through the SAN 500, or by the user B accessing the storage control device 100 from the data processing devices 3 through 5 (200) via a relay through the SAN 500. The instruction to modify the configuration entered from the data processing device 200 via a relay through the SAN 500 is transmitted to the modules 902 to 905 through the RMI 901, and the configurations of the modules 902 to 905 are modified. The login data and setting data are delivered to the history data management module 907 from the modules 902 to 905, and are stored in the history data storage unit 908 as a series of history data. The explanation of the detailed functions of the modules is redundant, and will be omitted here.

The optimum form for implementing the invention was explained above, but the form of implementation described above is for making it easy to understand the present invention, and not for limiting the interpretation of the present invention. The present invention can be modified and improved without deviating from the gist thereof, and equivalent systems also comprise the present invention.

What is claimed is:

1. A storage system, comprising:
    a plurality of ports, each receiving data from at least one of a plurality of data processing devices;
    a cache memory storing data received via said plurality of ports;
    a plurality of RAID (Redundant Arrays of Inexpensive Disks) groups, each comprising a plurality of disks storing data stored in said cache memory;
    a first resource group comprising a first port selected from said plurality of ports, a first cache portion logically partitioned in said cache memory, and a first RAID group selected from said plurality of RAID groups;
    a second resource group comprising a second port selected from said plurality of ports, a second cache portion logically partitioned in said cache memory, and a second RAID group selected from said plurality of RAID groups; and
    a module managing first log information of said first resource group and second log information of said second resource group on a resource group basis,
    wherein said first log information comprises a time of performing a first login operation for logging in the first resource group and information indicating whether or not the first login operation has been executed appropriately,
    wherein a first manager is permitted to refer to said first log information assigned to said first resource group and to modify a configuration of said first resource group,
    wherein said second log information comprises a time of performing a second login operation for logging in the second resource group and information indicating whether or not the second login operation has been executed appropriately, wherein a second manager is permitted to refer to said second log information assigned to said second resource group and to modify a configuration said second resource group, and wherein a system manager is permitted to refer to both said first log information and said second log information, and to modify the configuration of said storage system.

2. The storage system according to the claim 1, further comprising:
- a log information storage unit that stores said first log information and said second log information on a resource group basis.

3. The storage system according to the claim 1,
- wherein said module creates said first log information by collecting information from said first resource group and creates said second log information by collecting information from said second resource group.

4. The storage system according to the claim 1, wherein said module comprises:
- (1) a cache logical partition management module, which manages information of a configuration modification of said first cache portion and said second cache portion;
- (2) a port management module, which manages information of configuration modification of said first port and said second port; and
- (3) a log information management module collecting said information of configuration modification of said first cache portion and said second cache portion from said cache logical partition management module and collecting said information of configuration modification of said first port and said second port from said port management module and creating said first log information and said second log information based on collected information.

5. The storage system according to the claim 4,
- wherein a plurality of logical units are each provided for at least one of said plurality of data processing devices and are each related to at least a portion of said plurality of disks,
- wherein said module further comprises: (4) a logical unit management module, which manages information of configuration modification of a first logical unit and a second logical unit, and
- wherein said log information management module collects said information of configuration modification of said first logical unit and said second logical unit from said logical unit management module and creates said first log information and said second log information based on collected information.

6. A program that is tangibly embodied in a computer-readable storage medium, wherein said program is executed on a computer in a storage system, wherein the storage system comprises a plurality of ports, a cache memory, a plurality of RAID (Redundant Arrays of Inexpensive Disks), a first resource group, a second resource group, and a module, and wherein said program causes said computer to perform steps of:
- receiving, by each of said plurality of ports, data from at least one of a plurality of data processing devices;
- storing, in said cache memory, data received via said plurality of ports,
- wherein said plurality of RAID groups each comprise a plurality of disks storing data stored in said cache memory,
- wherein said first resource group comprises a first port selected from said plurality of ports, a first cache portion logically partitioned in said cache memory and a first RAID group selected from said plurality of RAID groups, and
- wherein said second resource group comprises a second port selected from said plurality of ports, a second cache portion logically partitioned in said cache memory and a second RAID group selected from said plurality of RAID groups; and
- managing, by said module, first log information of said first resource group and second log information of said second resource group on a resource group basis,
- wherein said first log information comprises a time of performing a first login operation for logging in the first resource group and information indicating whether or not the first login operation has been executed appropriately,
- wherein a first manager is permitted to refer to said first log information assigned to said first resource group and to modify a configuration of said first resource group,
- wherein said second log information comprises a time of performing a second login operation for logging in the second resource group and information indicating whether or not the second login operation has been executed appropriately,
- wherein a second manager is permitted to refer to said second log information assigned to said second resource group and to modify a configuration said second resource group, and
- wherein a system manager is permitted to refer to both said first log information and said second log information, and to modify the configuration of said storage system.

7. The program according to the claim 6,
- wherein said first log information further comprises information regarding login by a first manager assigned to said first resource group, and
- wherein said second log information further comprises information regarding login by a second manager assigned to said second resource group.

8. The program according to the claim 6, wherein said program causes said computer to further perform steps of:
- storing, in a log information storage unit of said storage system, said first log information and said second log information on a resource group basis.

9. The program according to the claim 6, wherein said program causes said computer to further perform steps of:
- creating, by said module, said first log information by collecting information from said first resource group; and
- creating, by said module, said second log information by collecting information from said second resource group.

10. The program according to the claim 6, wherein said program causes said computer to further perform steps of:
- managing, by a cache logical partition management module of said module, information of a configuration modification of said first cache portion and said second cache portion;
- managing, by a port management module of said module, information of configuration modification of said first port and said second port;
- collecting, by a log information management module of said module, said information of configuration modification of said first cache portion and said second cache portion from said cache logical partition management module;

collecting, by said log information management module, said information of configuration modification of said first port and said second port from said port management module; and creating, by said log information management module, said first log information and said second log information based on collected information.

11. The program according to the claim 10,
wherein a plurality of logical units are each provided for at least one of said plurality of data processing devices and are each related to at least a portion of said plurality of disks, and wherein said program causes said computer to further perform steps of:

managing, by a logical unit management module of said module, information of configuration modification of a first logical unit and a second logical unit;

collecting, by said log information management module, said information of configuration modification of said first logical unit and said second logical unit from said logical unit management module; and creating, by said log information management module, said first log information and said second log information based on collected information.

12. A storage management method implemented in a storage system, wherein the storage system comprises a plurality of ports, a cache memory, a plurality of RAID (Redundant Arrays of Inexpensive Disks), a first resource group, a second resource group, and a module, said method comprising:

receiving, by each of said plurality of ports, data from at least one of a plurality of data processing devices;

storing, in said cache memory, data received via said plurality of ports, wherein said plurality of RAID groups each comprise a plurality of disks storing data stored in said cache memory, wherein said first resource group comprises a first port selected from said plurality of ports, a first cache portion logically partitioned in said cache memory and a first RAID group selected from said plurality of RAID groups, and wherein said second resource group comprises a second port selected from said plurality of ports, a second cache portion logically partitioned in said cache memory and a second RAID group selected from said plurality of RAID groups; and managing, by said module, first log information of said first resource group and second log information of said second resource group second on a resource group basis, wherein said first log information comprises a time of performing a first login operation for logging in the first resource group and information indicating whether or not the first login operation has been executed appropriately, wherein a first manager is permitted to refer to said first log information assigned to said first resource group and to modify a configuration of said first resource group, wherein said second log information comprises a time of performing a second login operation for logging in the second resource group and information indicating whether or not the second login operation has been executed appropriately, wherein a second manager is permitted to refer to said second log information assigned to said second resource group and to modify a configuration said second resource group, and wherein a system manager is permitted to refer to both said first log information and said second log information, and to modify the configuration of said storage system.

13. The storage management method according to the claim 12,
wherein said first log information further comprises information regarding login by a first manager assigned to said first resource group, and wherein said second log information further comprises information regarding login by a second manager assigned to said second resource group.

14. The storage management method according to the claim 12, further comprising:
storing, in a log information storage unit of said storage system, said first log information and said second log information on a resource group basis.

15. The storage management method according to the claim 12, further comprising:
creating, by said module, said first log information by collecting information from said first resource group; and creating, by said module, said second log information by collecting information from said second resource group.

16. The storage management method according to the claim 12, further comprising:
managing, by a cache logical partition management module of said module, information of a configuration modification of said first cache portion and said second cache portion;

managing, by a port management module of said module, information of configuration modification of said first port and said second port;

collecting, by a log information management module of said module, said information of configuration modification of said first cache portion and said second cache portion from said cache logical partition management module;

collecting, by said log information management module, said information of configuration modification of said first port and said second port from said port management module; and creating, by said log information management module, said first log information and said second log information based on collected information.

17. The storage management method according to the claim 16,
wherein a plurality of logical units are each provided for at least one of said plurality of data processing devices and are each related to at least a portion of said plurality of disks, and wherein said method further comprises:
managing, by a logical unit management module of said module, information of configuration modification of a first logical unit and a second logical unit;

collecting, by said log information management module, said information of configuration modification of said first logical unit and said second logical unit from said logical unit management module; and creating, by said log information management module, said first log information and said second log information based on collected information.

18. The storage system according to claim 1, wherein the storage system refuses a request from said second manager to refer to said first log information.

* * * * *